(12) United States Patent
Mizuno

(10) Patent No.: US 11,958,492 B2
(45) Date of Patent: Apr. 16, 2024

(54) VEHICLE CONTROL DEVICE

(71) Applicant: SUBARU CORPORATION, Tokyo (JP)

(72) Inventor: Shuuto Mizuno, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 95 days.

(21) Appl. No.: 17/590,348

(22) Filed: Feb. 1, 2022

(65) Prior Publication Data

US 2022/0258754 A1 Aug. 18, 2022

(30) Foreign Application Priority Data

Feb. 15, 2021 (JP) .................... 2021-021431

(51) Int. Cl.
*B60W 50/08* (2020.01)
*B60W 30/18* (2012.01)

(52) U.S. Cl.
CPC .... *B60W 50/082* (2013.01); *B60W 30/18072* (2013.01); *B60W 30/18109* (2013.01); *B60W 50/085* (2013.01); *B60W 2520/105* (2013.01)

(58) Field of Classification Search
CPC ......... B60W 50/082; B60W 30/18072; B60W 30/18109; B60W 50/085; B60W 2520/105; B60W 30/18127; B60L 7/18; B60L 15/28; B60L 2240/423; B60L 2260/24; B60L 2260/44
See application file for complete search history.

(56) References Cited

U.S. PATENT DOCUMENTS

| | | | |
|---|---|---|---|
| 5,915,801 A | 6/1999 | Taga et al. | |
| 11,820,254 B2 * | 11/2023 | Crombez | ............ B60L 15/2045 |
| 2007/0018499 A1 * | 1/2007 | Kokubo | .................... B60L 7/14 |
| | | | 303/151 |
| 2011/0098886 A1 * | 4/2011 | Deng | ................ B60W 50/0098 |
| | | | 701/72 |

(Continued)

FOREIGN PATENT DOCUMENTS

| | | |
|---|---|---|
| JP | 09-37407 A | 2/1997 |
| JP | 2003-250202 A | 9/2003 |

(Continued)

*Primary Examiner* — Jason Holloway
*Assistant Examiner* — Madison B Emmett
(74) *Attorney, Agent, or Firm* — Rimon P.C.

(57) ABSTRACT

A vehicle control device configured to control a driving motor coupled to a wheel of a vehicle includes a motor controller and a driving mode determiner. The motor controller is configured to control the driving motor so that the driving motor enters a regenerative state while the vehicle is coasting and stops accelerating. The driving mode determiner is configured to determine whether the vehicle is in a first or second driving mode. In the first driving mode, a driving operation strength is low and the vehicle behavior is slow and gentle. In the second driving mode, the driving operation strength is high and the vehicle behavior is quick and active. When the vehicle stops accelerating in the second driving mode, the motor controller is configured to make a regenerative torque of the driving motor smaller than when the vehicle stops accelerating in the first driving mode.

15 Claims, 18 Drawing Sheets

(56) References Cited

U.S. PATENT DOCUMENTS

| | | | |
|---|---|---|---|
| 2013/0162009 A1* | 6/2013 | Mitts | B60L 7/26 |
| | | | 303/3 |
| 2015/0239442 A1* | 8/2015 | Yamakado | B60T 8/17555 |
| | | | 701/70 |
| 2015/0291152 A1* | 10/2015 | Mould | B60W 40/09 |
| | | | 180/65.225 |
| 2016/0107649 A1 | 4/2016 | Takeuchi et al. | |
| 2016/0159225 A1* | 6/2016 | Nakatsu | B60L 15/2009 |
| | | | 701/70 |
| 2016/0347181 A1* | 12/2016 | Yamakado | B60T 7/22 |
| 2016/0368384 A1* | 12/2016 | Johansson | B60L 3/102 |
| 2017/0282897 A1* | 10/2017 | Shimizu | B60K 1/02 |
| 2019/0225199 A1* | 7/2019 | Zhang | B60T 13/586 |
| 2020/0172109 A1* | 6/2020 | Son | B60W 30/18127 |
| 2021/0122371 A1* | 4/2021 | Choi | B60L 7/18 |

FOREIGN PATENT DOCUMENTS

| | | | |
|---|---|---|---|
| JP | 6044713 | B2 | 11/2016 |
| JP | 2020-33884 | A | 3/2020 |

\* cited by examiner

FIG. 16
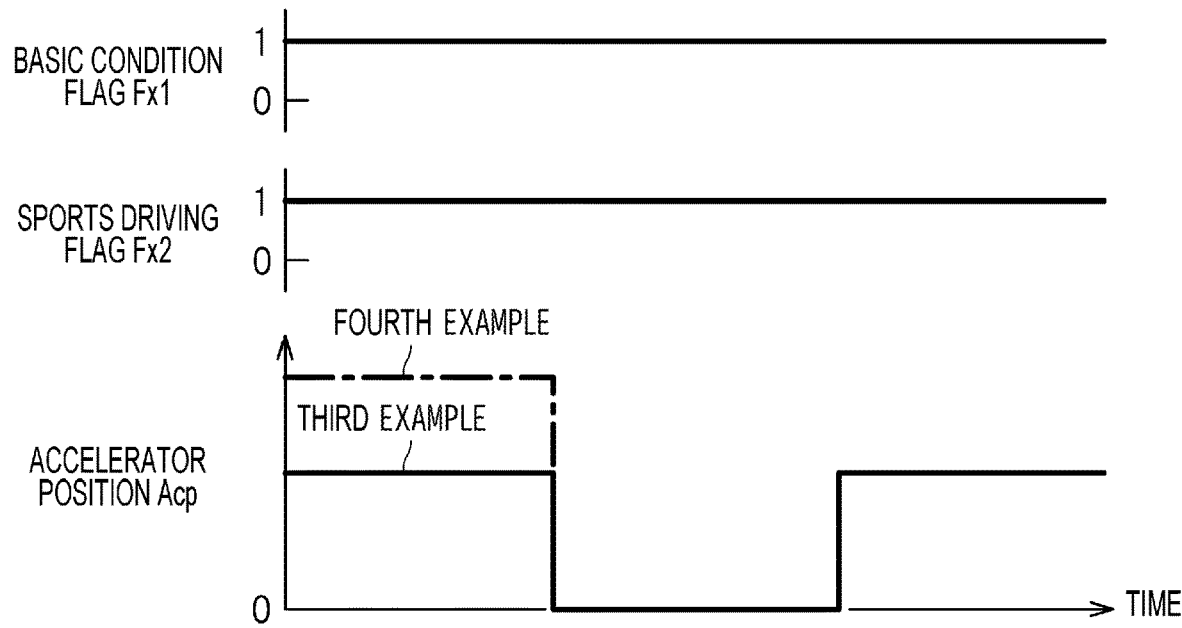
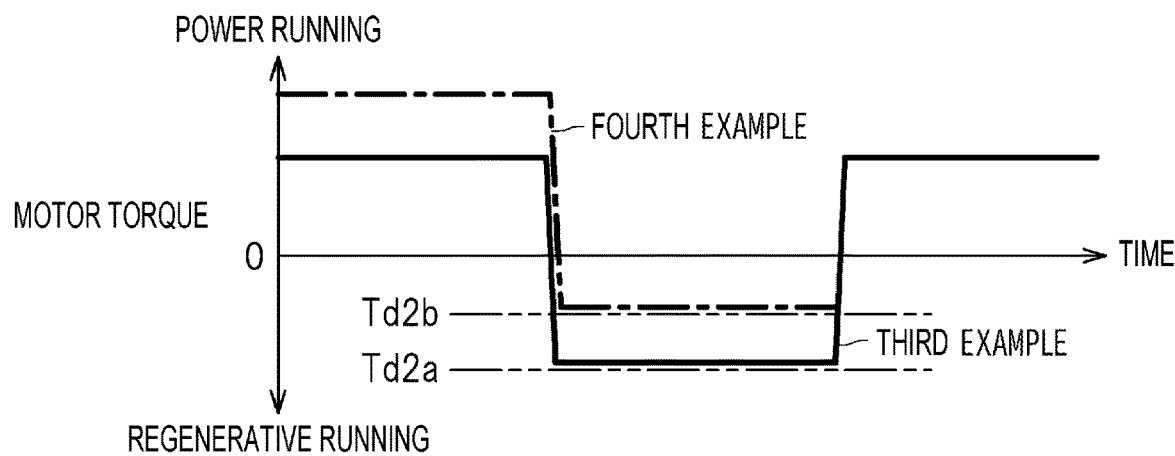
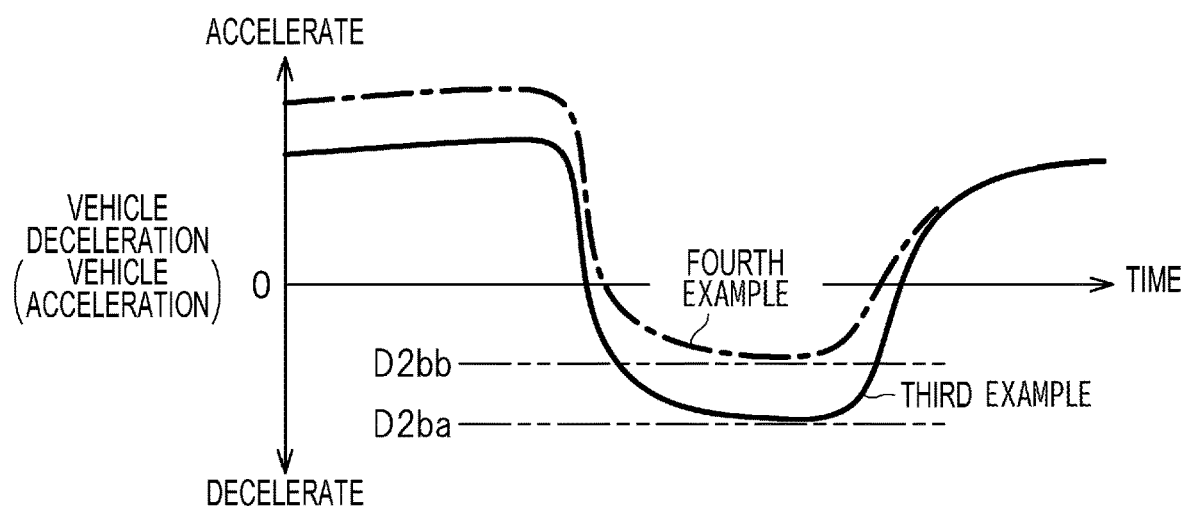

VEHICLE CONTROL DEVICE

CROSS-REFERENCE TO RELATED APPLICATIONS

The present application claims priority from Japanese Patent Application No. 2021-021431 filed on Feb. 15, 2021, the entire contents of which are hereby incorporated by reference.

BACKGROUND

The disclosure relates to a vehicle control device that controls a driving motor coupled to a wheel of a vehicle.

A vehicle, such as an electric automobile or a hybrid vehicle, includes a driving motor coupled to a wheel of the vehicle. While the vehicle is coasting without using an accelerator, a regenerative torque of the driving motor is controlled based on certain factors, such as the vehicle velocity, and the degree of vehicle deceleration is adjusted so that a driver does not feel uncomfortable (see Japanese Unexamined Patent Application Publication Nos. 2020-33884, 2003-250202, and H9-37407 and Japanese Patent No. 6044713).

SUMMARY

An aspect of the disclosure provides a vehicle control device to be applied to a vehicle. The vehicle control device is configured to control a driving motor coupled to a wheel of the vehicle. The vehicle control device includes a motor controller and a driving mode determiner. The motor controller is configured to control the driving motor so that the driving motor enters a regenerative state while the vehicle is coasting and stops accelerating. The driving mode determiner is configured to determine whether the vehicle is in a first driving mode or a second driving mode. The first driving mode is a mode in which a driving operation strength is low and behavior of the vehicle is slow and gentle. The second driving mode is a mode in which the driving operation strength is high and the behavior of the vehicle is quick and active. In a case where the vehicle stops accelerating in the second driving mode, the motor controller is configured to make a regenerative torque of the driving motor smaller than in a case where the vehicle stops accelerating in the first driving mode.

An aspect of the disclosure provides a vehicle control device to be applied to a vehicle. The vehicle control device is configured to control a driving motor coupled to a wheel of a vehicle. The vehicle control device includes circuitry. The circuitry is configured to control the driving motor so that the driving motor enters a regenerative state while the vehicle is coasting and stops accelerating. The circuitry is configured to determine whether the vehicle is in a first driving mode or a second driving mode. The first driving mode is a mode in which a driving operation strength is low and behavior of the vehicle is slow and gentle. The second driving mode is a mode in which the driving operation strength is high and the behavior of the vehicle is quick and active. In a case where the vehicle stops accelerating in the second driving mode, the circuitry is configured to make a regenerative torque of the driving motor smaller than in a case where the vehicle stops accelerating in the first driving mode.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 16 is a timing chart illustrating an example of the execution of drivability improvement control according to examples;

DETAILED DESCRIPTION

As stated above, the degree of vehicle deceleration is adjusted so as not to make a driver uncomfortable. However, the degree of vehicle deceleration may differ depending on a driving situation, such as a situation where a vehicle stops accelerating. That is, adjusting the degree of vehicle deceleration merely based on certain factors, such as the vehicle velocity, may make a driver feel uncomfortable.

It is desirable to suitably control the degree of deceleration of a vehicle while the vehicle is coasting.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

[Vehicle Configuration]

Figure 1:
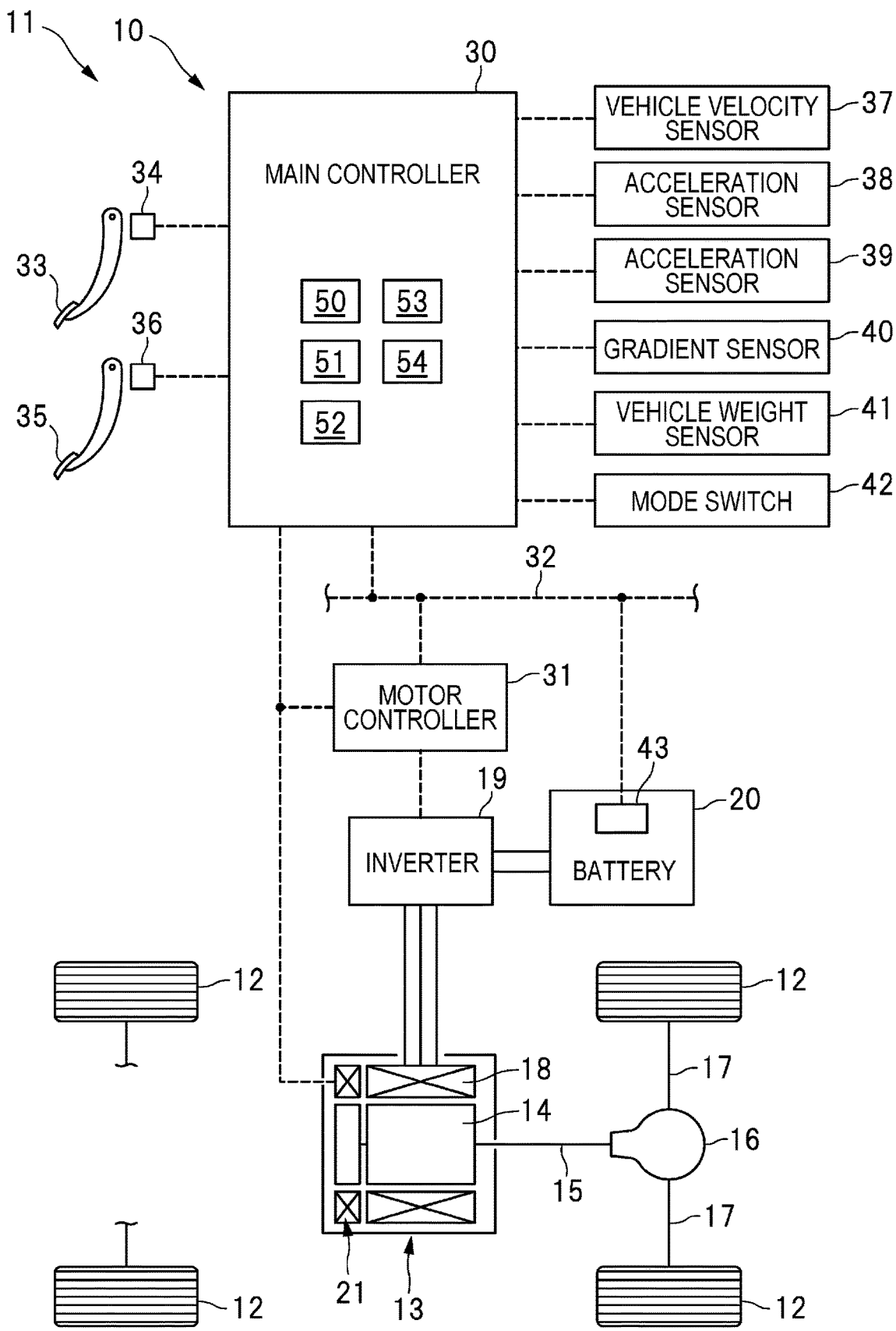
FIG. 1 is a schematic diagram illustrating an example of the configuration of a vehicle including a vehicle control device, which is an embodiment of the disclosure.

FIG. 1 is a schematic diagram illustrating an example of the configuration of a vehicle 11 including a vehicle control device 10, which is the embodiment of the disclosure. As illustrated in FIG. 1, the vehicle 11 includes a driving motor 13 coupled to wheels 12. The wheels 12 are coupled to a rotor of the driving motor 13 via a motor output shaft 15, a differential mechanism 16, and wheel drive shafts 17, for example. An inverter 19 is coupled to a stator 18 of the driving motor 13. A battery 20, such as a lithium-ion battery, is coupled to the inverter 19. A rotation sensor 21, such as a resolver, is provided in the driving motor 13.

The vehicle control device 10 includes a main controller 30 and a motor controller 31, each of which is constituted by a microcomputer, for example. Various sensors are coupled to the main controller 30. The main controller 30 sets various values, such as a target motor torque of the driving motor 13, based on signals output from various sensors. The main controller 30 also sends the set target motor torque to the motor controller 31, and the motor controller 31 generates a drive signal for the inverter 19 based on the target motor torque. The inverter 19, which is controlled by the drive signal, converts direct current (DC) power of the battery 20 into alternating current (AC) power and supplies the AC power to the driving motor 13. In this manner, the driving motor 13 is controlled to realize the target motor torque. The main controller 30 and the motor controller 31 are coupled to each other via an in-vehicle network 32, such as a controller area network (CAN), so that they can communicate with each other.

An accelerator sensor 34 and a brake sensor 36 are coupled to the main controller 30. The accelerator sensor 34 detects the amount by which an accelerator pedal 33 is stepped on (such an amount will be called the accelerator position Acp). The brake sensor 36 detects the amount by which a brake pedal 35 is stepped on. A vehicle velocity sensor 37 and acceleration sensors 38 and 39 are also coupled to the main controller 30. The vehicle velocity sensor 37 detects the vehicle velocity V, which is the running speed of the vehicle 11. The acceleration sensor 38 detects longitudinal acceleration Gx acting in the longitudinal (front-back) direction of the vehicle 11. The acceleration sensor 39 detects lateral acceleration Gy acting in the widthwise direction of the vehicle 11. A gradient sensor 40, a vehicle weight sensor 41, a mode switch 42, and the rotation sensor 21 are also coupled to the main controller 30. The gradient sensor 40 detects the gradient θ of a driving road. The vehicle weight sensor 41 detects the weight Wv of the vehicle 11. The mode switch 42 is used for setting the regenerative mode (high regenerative mode or low regenerative mode). The rotation sensor 21 detects the rotational speed Nm of the driving motor 13.

A battery controller 43 is disposed in the battery 20 to monitor the charging/discharging state of the battery 20. Various sensors, such as a temperature sensor, a current sensor, and a voltage sensor (none of them are illustrated), are coupled to the battery controller 43. The battery controller 43 calculates the state of charge (SOC) of the battery 20, based on certain values, such as the charging/discharging current. The SOC is the ratio of the remaining capacity of the battery 20, which is the ratio of the current charging level of the battery 20, to the fully charged capacity. For example, if the battery 20 is fully charged, the SOC is 100%, while if the battery 20 is fully discharged, the SOC is 0%.

[Main Controller]

Figure 2:
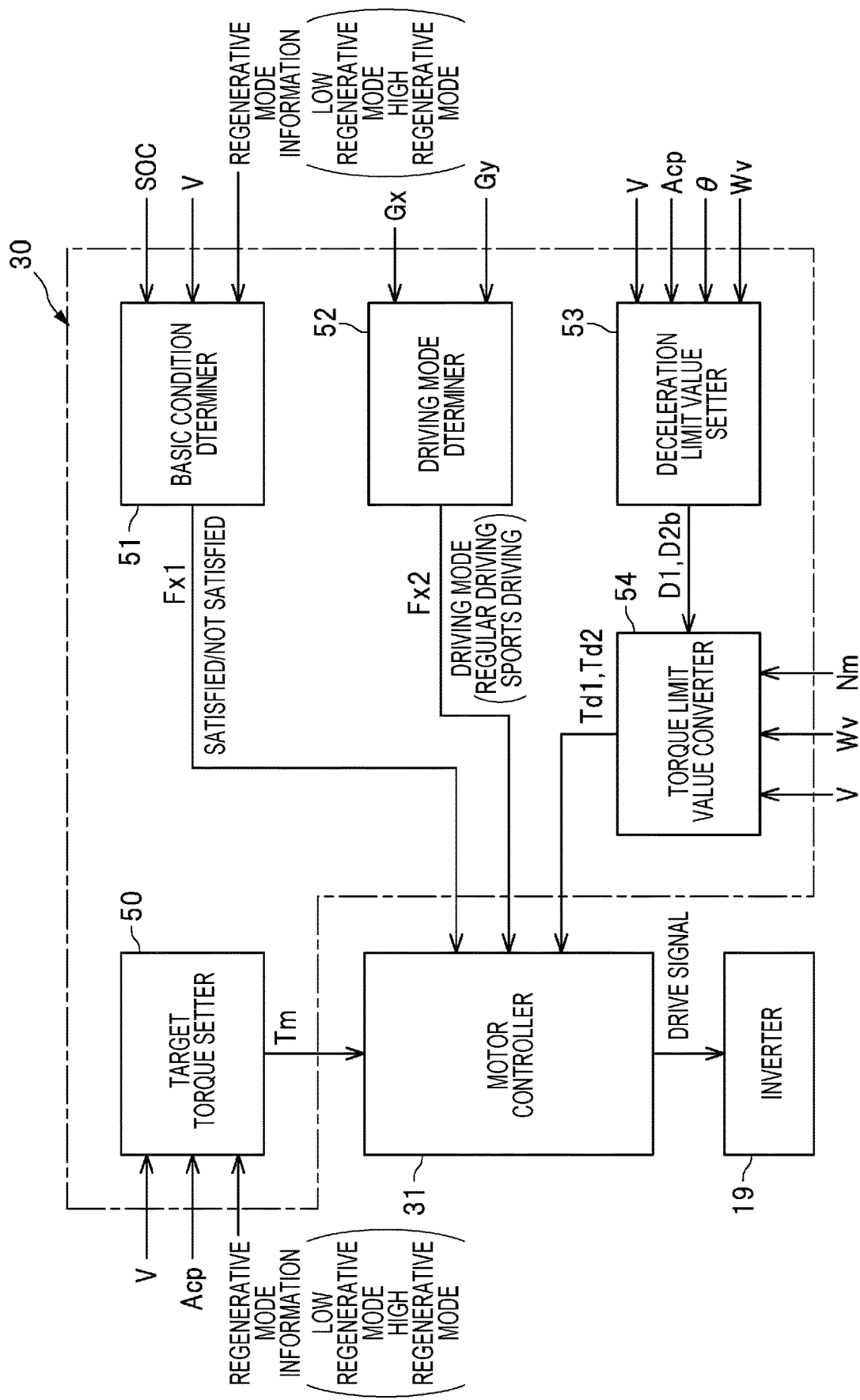
FIG. 2 is a block diagram illustrating an example of the configuration of a main controller.

FIG. 2 is a block diagram illustrating an example of the configuration of the main controller 30. As illustrated in FIG. 2, the main controller 30 includes a target torque setter 50, a basic condition determiner 51, a driving mode determiner 52, a deceleration limit value setter 53, and a torque limit value converter 54. In one embodiment, the driving mode determiner 52 may serve as a "driving mode determiner", and the deceleration limit value setter 53 may serve as a "limit value setter". The individual functions of the main controller 30 will be sequentially explained below.

(Target Torque Setting)

The target torque setter 50 of the main controller 30 sets a target motor torque Tm of the driving motor 13, based on the vehicle velocity V, the accelerator position Acp, and regenerative mode information. In one example, the accelerator position Acp may be an amount of the accelerating operation.

Figure 3:
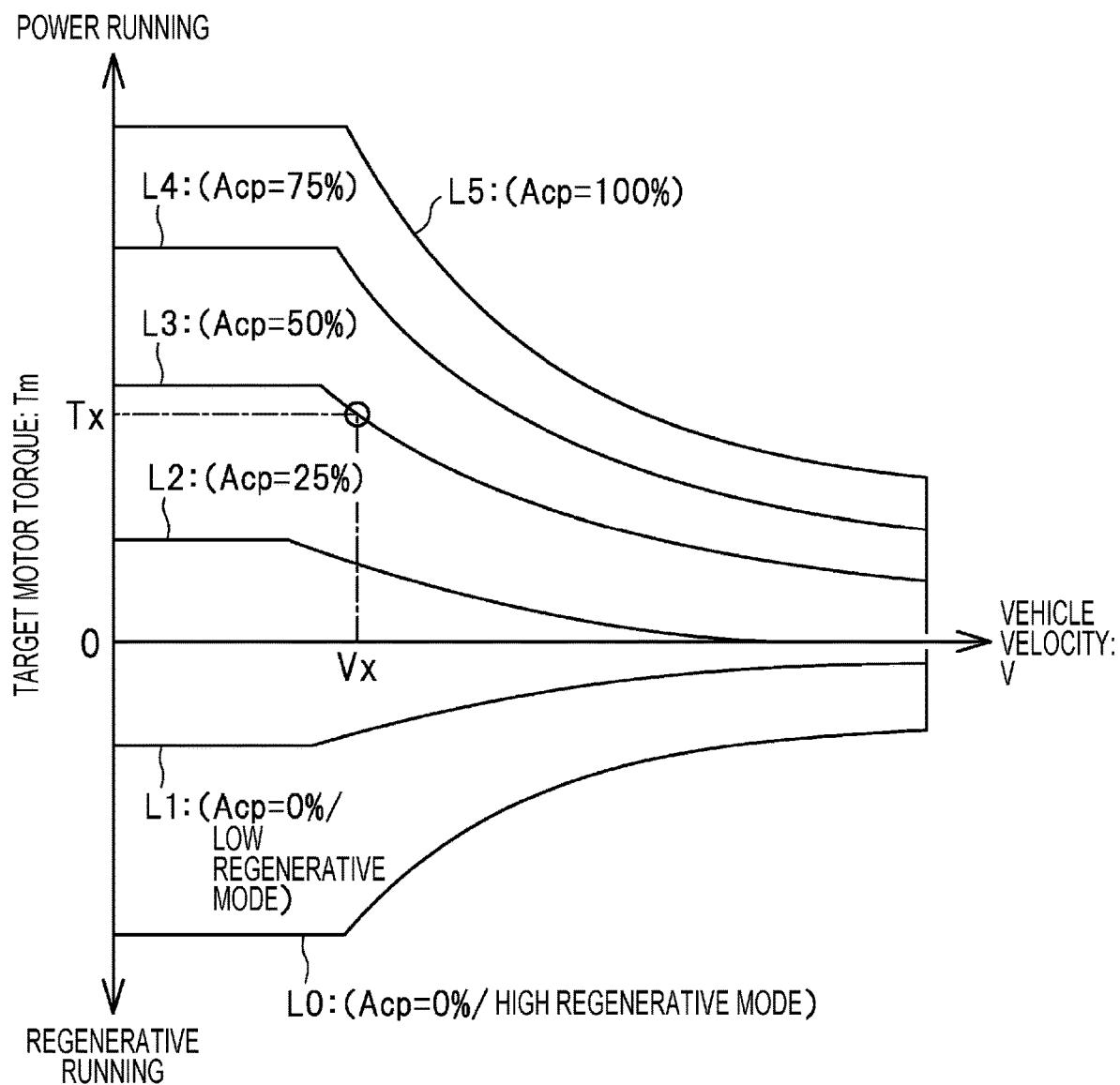
FIG. 3 is a graph illustrating an example of a torque map indicating a target motor torque.

FIG. 3 is a graph illustrating an example of a torque map indicating the target motor torque Tm. As illustrated in FIG. 3, characteristic lines L0 through L5 representing the target motor torque Tm are set in the torque map for individual accelerator positions Acp. When the accelerator position Acp is 0%, the target motor torque Tm is set in accordance with the characteristic line L0 or L1. When the accelerator position Acp is 25%, the target motor torque Tm is set in accordance with the characteristic line L2. When the accelerator position Acp is 50%, the target motor torque Tm is set in accordance with the characteristic line L3. When the accelerator position Acp is 75%, the target motor torque Tm is set in accordance with the characteristic line L4. When the accelerator position Acp is 100%, the target motor torque Tm is set in accordance with the characteristic line L5. For example, when the accelerator position Acp is 50% and the vehicle velocity is Vx, Tx is set as the target motor torque Tm.

The regenerative mode is used when the vehicle 11 is coasting without using the accelerator. In the vehicle 11, as the regenerative mode, the low regenerative mode and the high regenerative mode are available. In the low regenerative mode, the driving motor 13 is controlled with a low regenerative torque. In the high regenerative mode, the driving motor 13 is controlled with a high regenerative torque. In the torque map in FIG. 3, as the characteristic line to be used when the accelerator position Acp is 0%, the characteristic lines L1 and L2 are illustrated. When the low regenerative mode is selected, the characteristic line L1 is used. When the high regenerative mode is selected, the characteristic line L0 is used. That is, when the low regenerative mode is selected and the accelerator position Acp is 0%, the target motor torque Tm is set in accordance with the characteristic line L1. When the high regenerative mode is selected and the accelerator position Acp is 0%, the target motor torque Tm is set in accordance with the characteristic line L0. Using the high regenerative mode, which is also called a common pedal (one pedal) mode, can generate a high regenerative torque during coasting. This makes it possible to suitably decelerate the vehicle 11 without stepping on the brake pedal 35.

(Basic Condition Determination)

The basic condition determiner 51 of the main controller 30 determines whether basic conditions for executing drivability improvement control, which will be discussed later, are satisfied, based on the SOC of the battery 20, vehicle velocity V, and regenerative mode information. Drivability improvement control is executed to lower the degree of deceleration of a coasting vehicle in accordance with the driving situation so as not to give a driver discomfort. Details of drivability improvement control will be discussed later.

Figure 4:
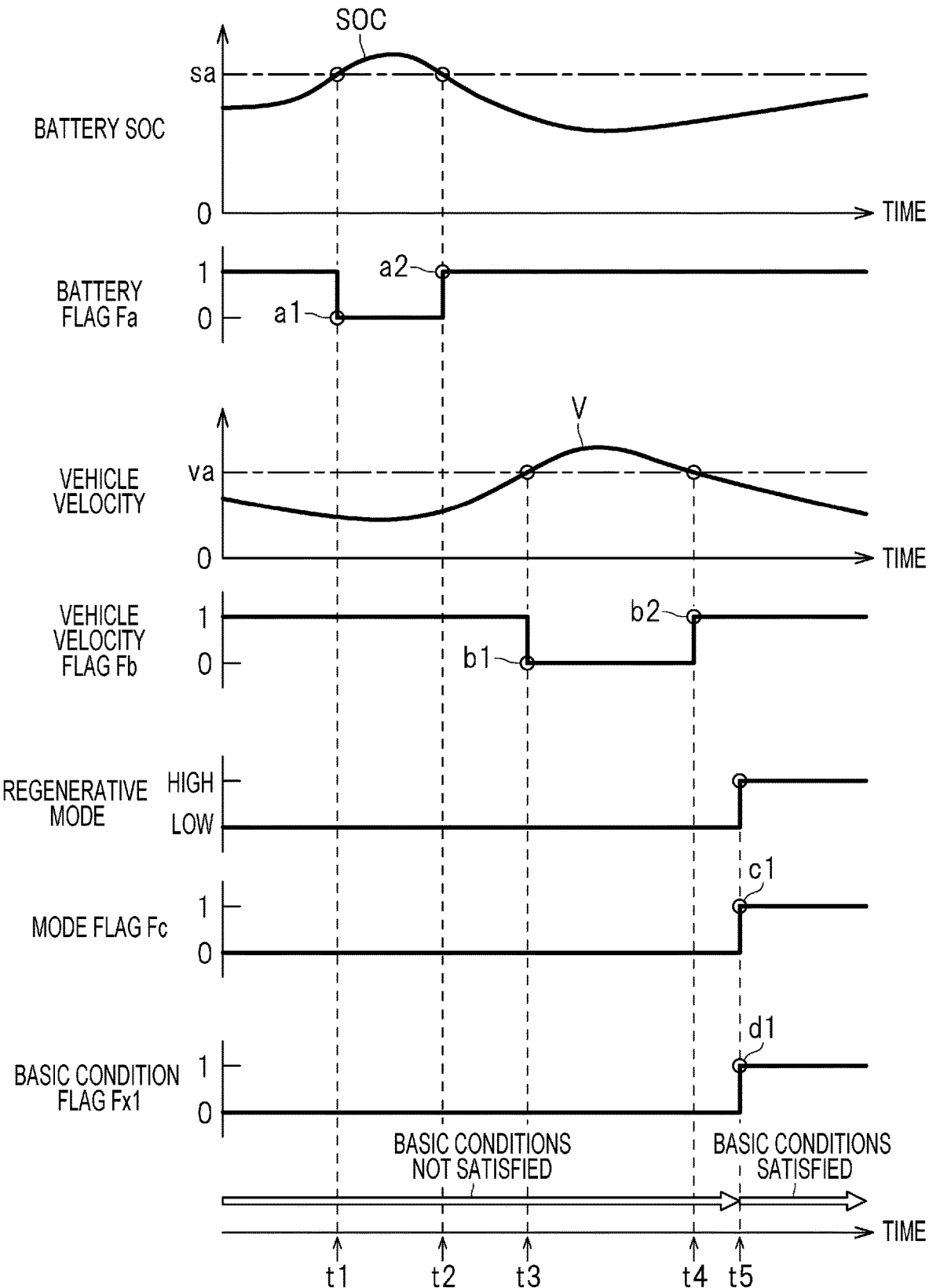
FIG. 4 is a timing chart illustrating an example of the execution of basic condition determination.

FIG. 4 is a timing chart illustrating an example of the execution of basic condition determination. At time t1, when the SOC of the battery 20 exceeds a predetermined threshold sa, a battery flag Fa is set to be 0 (indicated by a1 in FIG. 4). At time t2, when the SOC of the battery 20 becomes lower than the threshold sa, the battery flag Fa is set to be 1 (indicated by a2 in FIG. 4). The battery flag Fa is set to be 0 in a situation where an unfilled amount of the battery 20 that is an amount by which the battery 20 is to be charged is low and the execution of regenerative control for the driving motor 13 is restricted. In contrast, the battery flag Fa is set to be 1 in a situation where the unfilled amount of the battery 20 is high and the execution of regenerative control for the driving motor 13 is allowed.

At time t3 in FIG. 4, when the vehicle velocity V of the vehicle 11 exceeds a predetermined threshold va, a vehicle velocity flag Fb is set to be 0 (indicated by b1 in FIG. 4). At time t4, when the vehicle velocity V of the vehicle 11 becomes lower than the predetermined threshold va, the vehicle velocity flag Fb is set to be 1 (indicated by b2 in FIG. 4). At time t5, when the low regenerative mode is switched to the high regenerative mode using the mode switch 42, a mode flag Fc is set to be 1 (indicated by c1 in FIG. 4). At time t5, if the flags Fa, Fb, and Fc are all 1, a basic condition flag Fx1, which indicates that all the basic conditions are satisfied, is set to be 1 (indicated by dl in FIG. 4). If any of the flags Fa, Fb, and Fc is 0, it is determined that not all the basic conditions are satisfied, and the basic condition flag Fx1 is set to be 0.

(Driving Mode Determination)

The driving mode determiner 52 of the main controller 30 determines whether the driving mode of the vehicle 11 is regular driving or sports driving, based on the longitudinal acceleration Gx and the lateral acceleration Gy acting on the vehicle 11. Regular driving is a driving mode in which the longitudinal acceleration Gx and the lateral acceleration Gy are low and in which the driving operation strength is low and the vehicle behavior is slow and gentle. Sports driving is a driving mode in which the longitudinal acceleration Gx and the lateral acceleration Gy are high and in which the driving operation strength is high and the vehicle behavior is quick and active. In one example, regular driving may be used as a first driving mode, while sports driving may be used as a second driving mode. The driving operation strength is an index of the degree of driving performed by a driver. For example, if the driving operation strength is high, it means that the speed of driving operations (such as accelerating, braking, and steering operations) performed by the driver is fast. If the driving operation strength is low, it means that the speed of driving operations performed by the driver is slow.

Figure 5:
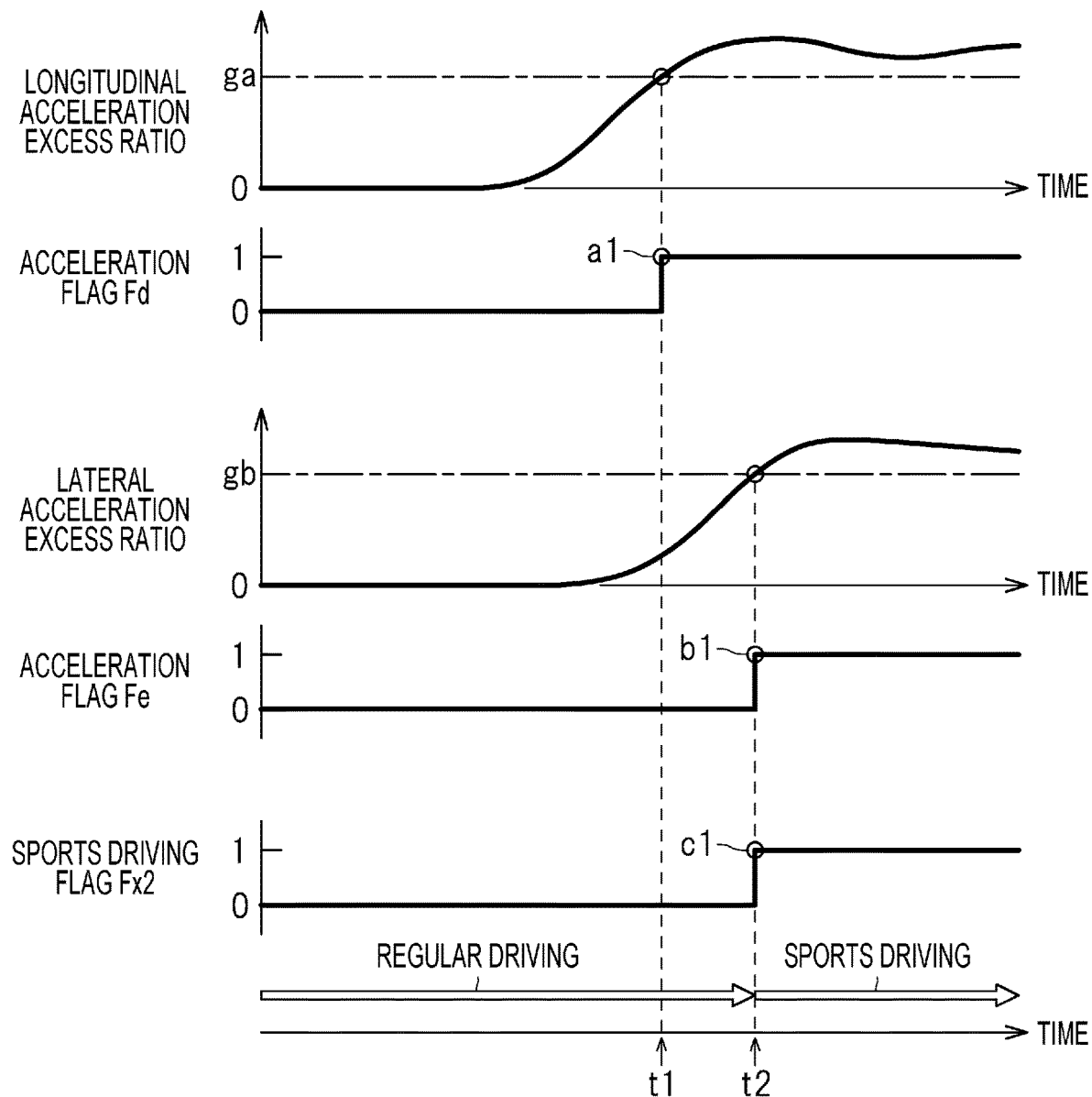
FIG. 5 is a timing chart illustrating an example of the execution of driving mode determination.
Figure 6:
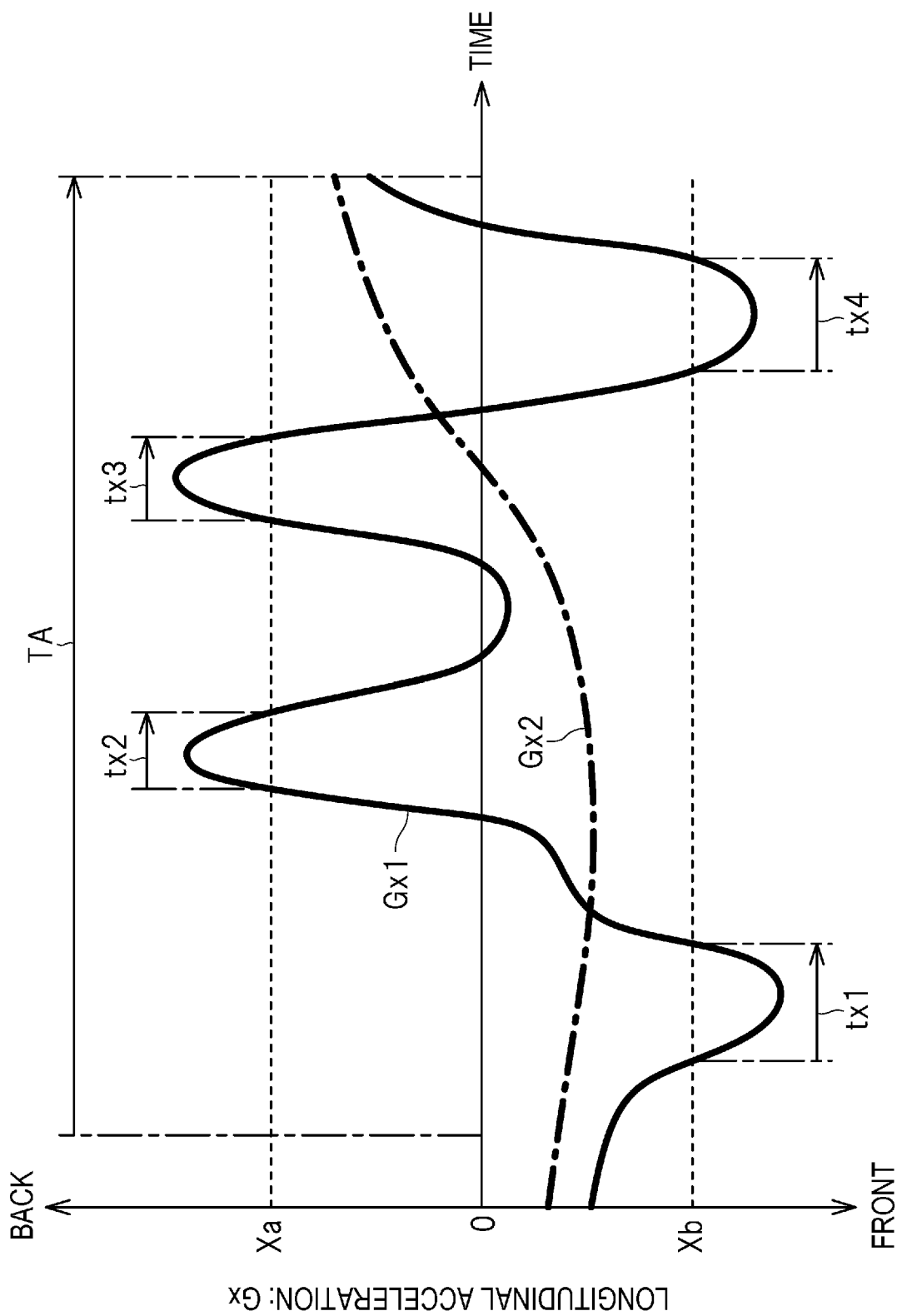
FIG. 6 is a graph illustrating an example of the transition of the longitudinal acceleration.
Figure 7:
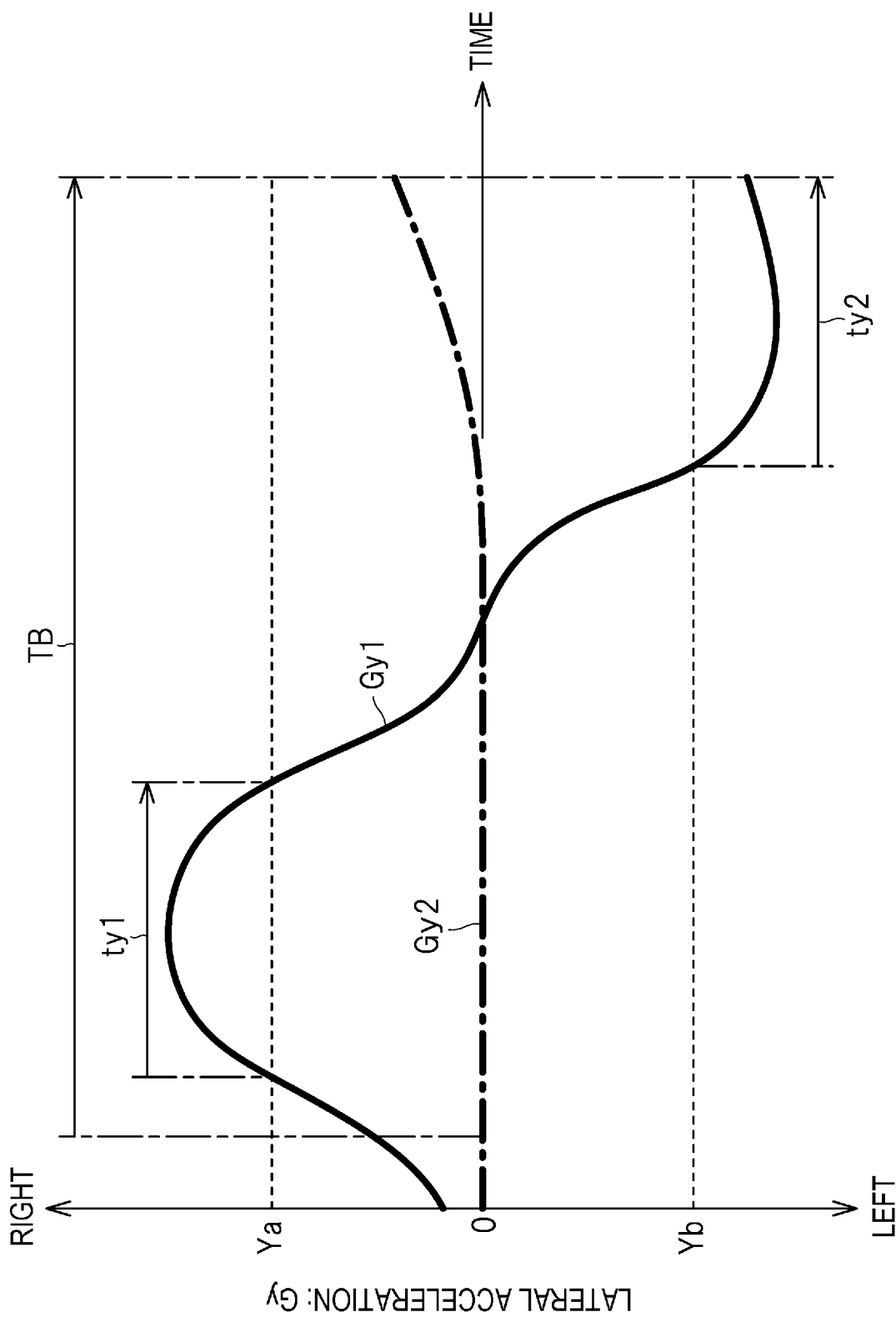
FIG. 7 is a graph illustrating an example of the transition of the lateral acceleration.

FIG. 5 is a timing chart illustrating an example of the execution of driving mode determination. FIG. 6 is a graph illustrating an example of the transition of the longitudinal acceleration Gx. FIG. 7 is a graph illustrating an example of the transition of the lateral acceleration Gy.

At time t1 in FIG. 5, when a longitudinal acceleration excess ratio exceeds a predetermined threshold ga, an acceleration flag Fd is set to be 1 (indicated by a1 in FIG. 5). At time t2, when a lateral acceleration excess ratio exceeds a predetermined threshold gb, an acceleration flag Fe is set to be (indicated by b1 in FIG. 5). When both of the acceleration flags Fd and Fe are 1, such as the situation at time t2, a sports driving flag Fx2, which indicates that the driving mode is sports driving, is set to be 1 (indicated by c1 in FIG. 5). If one or both of the acceleration flags Fd and Fe are 0, the driving mode is found to be regular driving and the sports driving flag Fx2 is set to be 0.

The longitudinal acceleration excess ratio illustrated in FIG. 5 is a ratio of the length of time for which the longitudinal acceleration Gx exceeds a predetermined threshold to a predetermined determination time. It is now assumed that, as illustrated in FIG. 6, the latest determination time for determining the driving mode of the vehicle 11 is indicated by a determination time TA and the lengths of times for which the longitudinal acceleration Gx exceeds one of predetermined thresholds Xa and Xb during the determination time TA are indicated by excess times tx1 through tx4. In this case, the ratio of the total excess times tx1 through tx4 to the determination time TA is the longitudinal acceleration excess ratio. If the longitudinal acceleration excess ratio is high, a driving situation where the longitudinal acceleration Gx fluctuates sharply, that is, the vehicle 11 accelerates or decelerates suddenly, as indicated by the solid line Gx1 in FIG. 6, can be assumed. If the longitudinal acceleration excess ratio is low, a driving situation where the longitudinal acceleration Gx does not fluctuate considerably, that is, the vehicle 11 accelerates or decelerates gently, as indicated by the long dashed dotted line Gx2 in FIG. 6, can be assumed.

For example, the acceleration sensor 38 detects the longitudinal acceleration Gx acting on the back side of the vehicle 11 as a positive value and that acting on the front side of the vehicle 11 as a negative value. The driving mode determine 52 thus calculates the longitudinal acceleration excess ratio, which is used for setting the acceleration flag Fd, by comparing the absolute value of the longitudinal acceleration Gx with the thresholds Xa and Xb.

The thresholds Xa and Xb may be the same value or may be different values.

The lateral acceleration excess ratio illustrated in FIG. 5 is a ratio of the length of time for which the lateral acceleration Gy exceeds a predetermined threshold to a predetermined determination time. It is now assumed that, as illustrated in FIG. 7, the latest determination time for determining the driving mode of the vehicle 11 is indicated by a determination time TB and the lengths of times for which the lateral acceleration Gy exceeds one of predetermined thresholds Ya and Yb during the determination time TB are indicated by excess times ty1 and ty2. In this case, the ratio of the total excess times ty1 and ty2 to the determination time TB is the lateral acceleration excess ratio. If the lateral acceleration excess ratio is high, a driving situation where the lateral acceleration Gy fluctuates sharply, that is, the vehicle 11 drives in a zigzag manner, as indicated by the solid line Gy1 in FIG. 7, can be assumed. If the lateral acceleration excess ratio is low, a driving situation where the lateral acceleration Gy does not fluctuate considerably, that is, the vehicle 11 drives almost straight, as indicated by the long dashed dotted line Gy2 in FIG. 7, can be assumed.

For example, the acceleration sensor 39 detects the lateral acceleration Gy acting on the right side of the vehicle 11 as a positive value and that acting on the left side of the vehicle 11 as a negative value. The driving mode determiner 52 thus calculates the lateral acceleration excess ratio, which is used for setting the acceleration flag Fe, by comparing the absolute value of the lateral acceleration Gy with the thresholds Ya and Yb.

The thresholds Ya and Yb may be the same value or may be different values.

(Setting of Deceleration Limit Value)

Figure 8:
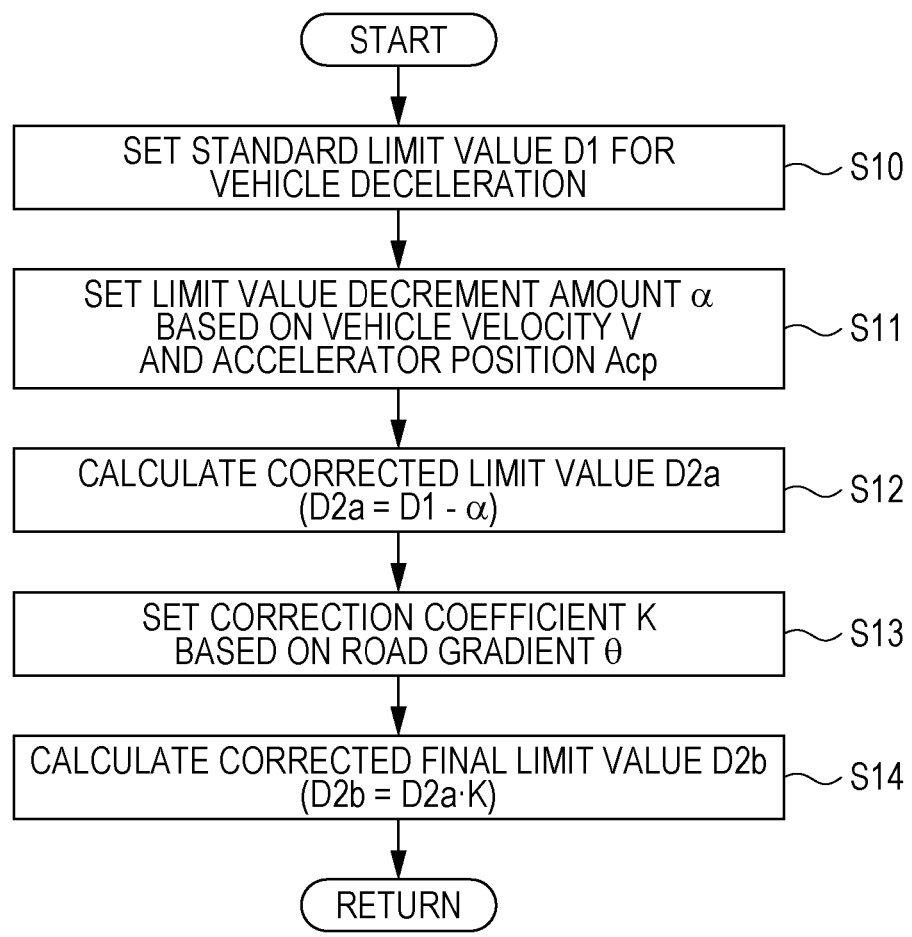
FIG. 8 is a flowchart illustrating a procedure for setting a standard limit value and a corrected final limit value.
Figure 9:
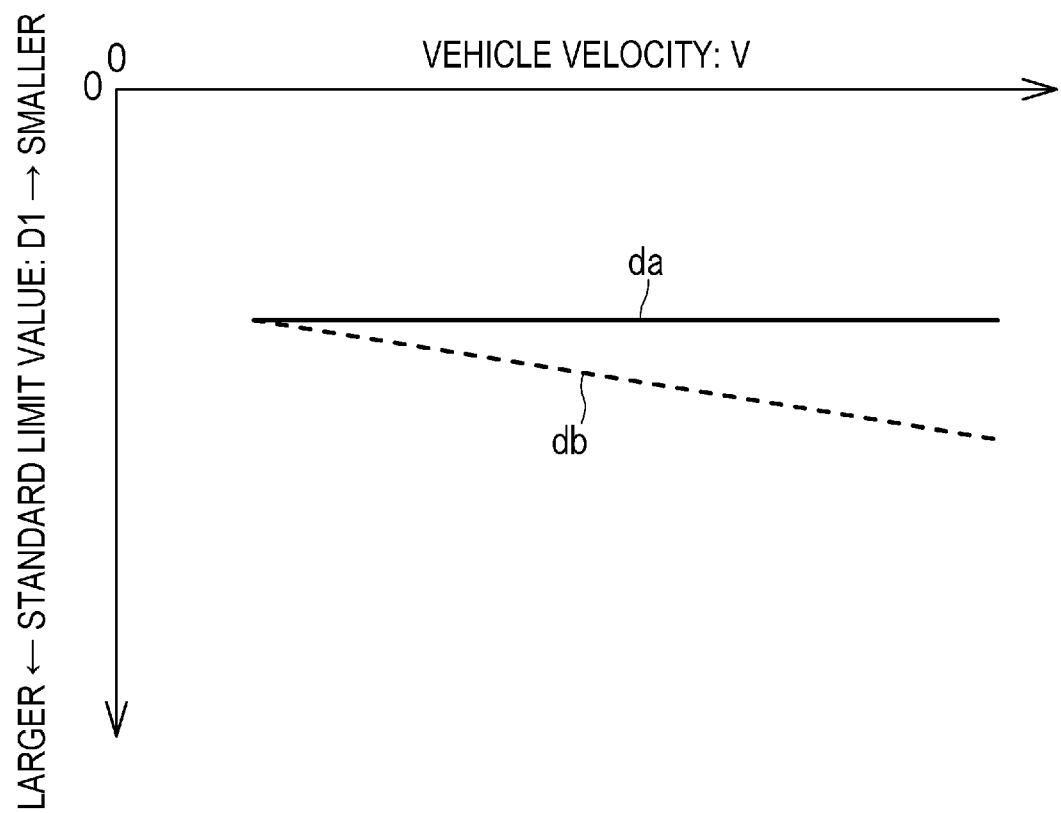
FIG. 9 is a graph illustrating an example of the standard limit value.
Figure 10A:
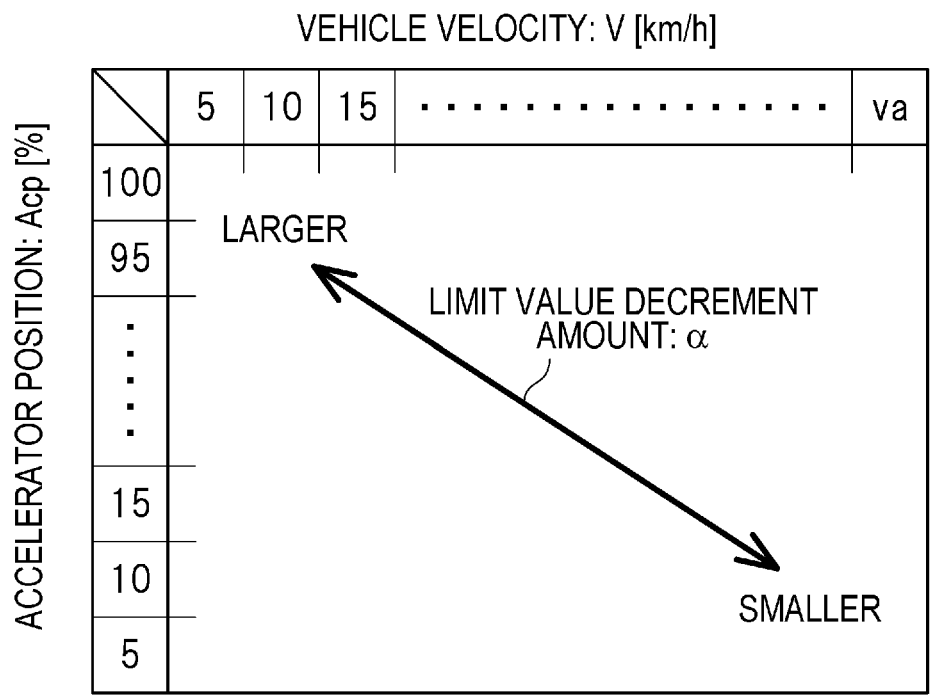
FIGS. 10A and 10B are graphs illustrating an example of a limit value decrement amount.
Figure 10B:
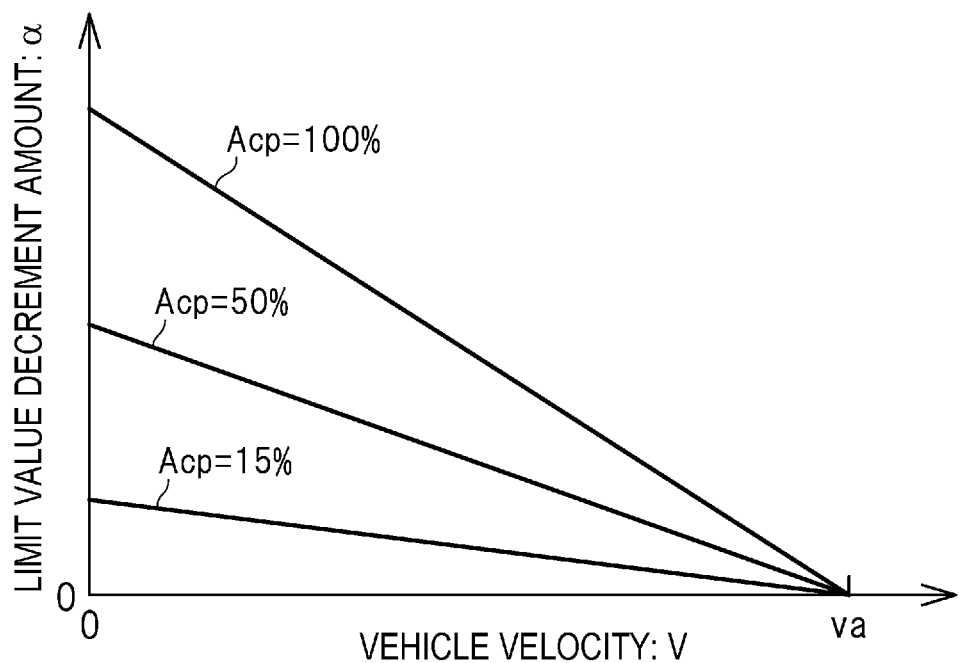
Figure 11:
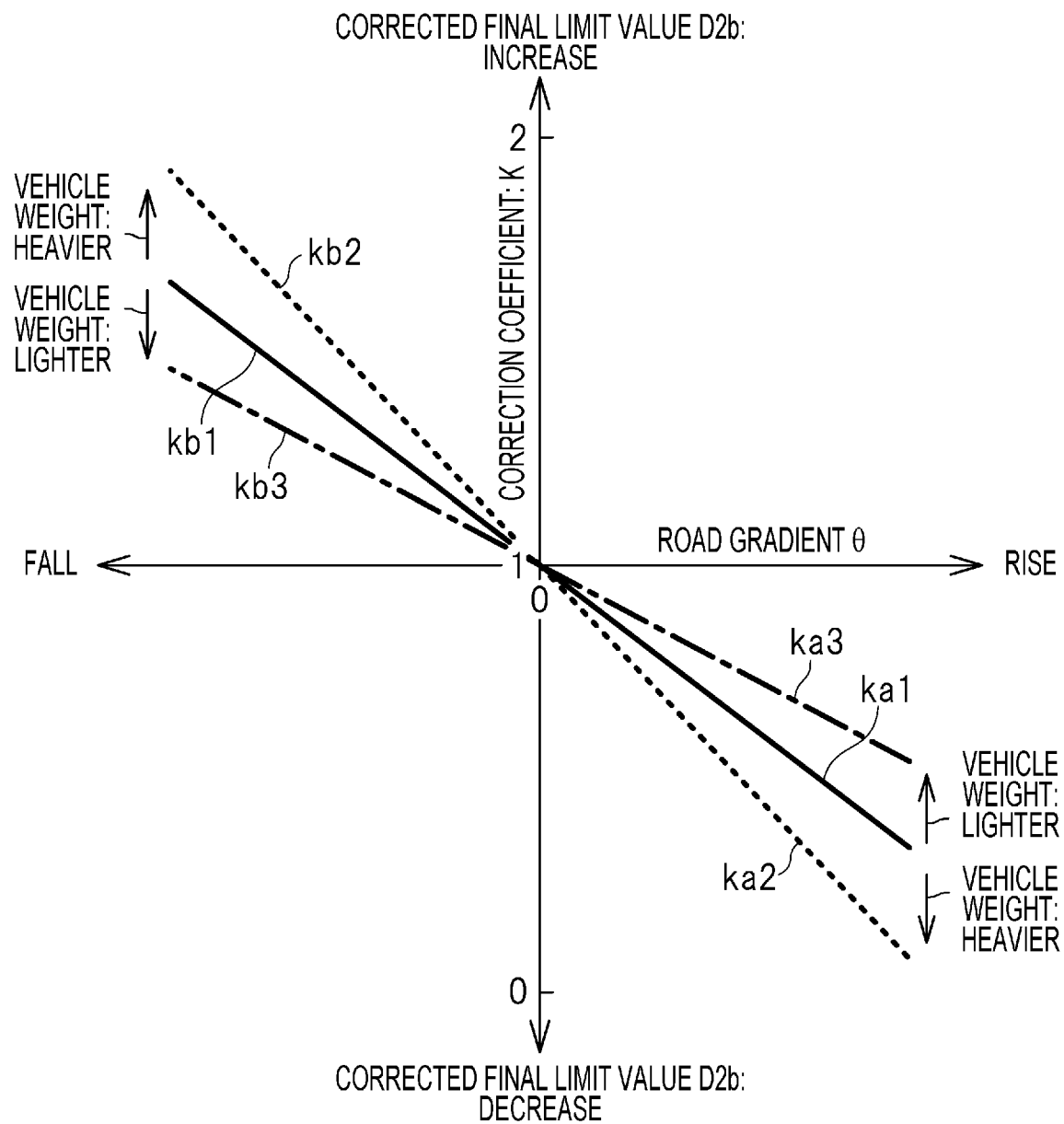
FIG. 11 is a graph illustrating an example of a correction coefficient.

As a limit value for the degree of vehicle deceleration to be used during coasting, the deceleration limit value setter 53 of the main controller 30 sets a standard limit value D1 and a corrected final limit value D2$b$, based on the vehicle velocity V, the accelerator position Acp, the road gradient θ, and the vehicle weight Wv. The corrected final limit value D2$b$ is smaller than the standard limit value D1. In one embodiment, the standard limit value D1 may be referred to as a "first limit value", while the corrected final limit value D2$b$ may be referred to as a "second limit value". FIG. 8 is a flowchart illustrating a procedure for setting the standard limit value D1 and the corrected final limit value D2$b$. FIG. 9 is a graph illustrating an example of the standard limit value D1. FIGS. 10A and 10B are graphs illustrating an example of a limit value decrement amount α. FIG. 11 is a graph illustrating an example of a correction coefficient K.

In the specification, the degree of vehicle deceleration means the degree of acceleration generated when a vehicle is decelerating. Hereinafter, a description will be given by assuming that the vehicle deceleration is a positive value. Additionally, the degree of vehicle deceleration may simply be called the vehicle deceleration.

In step S10 of FIG. 8, the standard limit value D1 for the vehicle deceleration is set.

As indicated by the solid line da in FIG. 9, a fixed value may be used as the standard limit value D1. Alternatively, as indicated by the broken line db in FIG. 9, a variable value, which becomes greater as the vehicle velocity V increases, may be used as the standard limit value D1. The standard limit value D1 is used for limiting the vehicle deceleration while the vehicle 11 is coasting in the regular driving mode and is set so as not to give a driver discomfort. That is, during regular-driving coasting, the vehicle deceleration is restricted to a value which does not exceed the standard limit value D1, thereby making it possible to decelerate the vehicle 11 without giving a driver discomfort.

Referring back to FIG. 8, in step S11, the limit value decrement amount α is set based on the vehicle velocity V and the accelerator position Acp. In step S12, a corrected limit value D2$a$ is calculated by subtracting the limit value decrement amount α from the standard limit value D1. In step S13, the correction coefficient K is set based on the road gradient θ. In step S14, the corrected final limit value D2$b$ is calculated by multiplying the corrected limit value D2$a$ by the correction coefficient K. The corrected final limit value D2$b$ is used for limiting the vehicle deceleration while the vehicle 11 is coasting in the sports driving mode and is set so as not to give a driver discomfort. That is, during sports-driving coasting, the vehicle deceleration is limited to a value which does not exceed the corrected final limit value D2$b$, thereby making it possible to decelerate the vehicle 11 without giving a driver discomfort.

As illustrated in FIGS. 10A and 10B, the limit value decrement amount α, which is to be subtracted from the standard limit value D1, is set to become greater as the vehicle velocity V becomes lower and as the accelerator position Acp becomes larger.

As illustrated in FIG. 11, the correction coefficient K, which is to be multiplied by the corrected limit value D2$a$, is set to be 1 when the road gradient θ is 0, namely, when the road is flat.

As indicated by the solid line ka1 in FIG. 11, when the driving road is a rising slope, the correction coefficient K is set to be lower than 1, and as the road gradient θ becomes greater, the correction coefficient K is set to be smaller. When the driving road is a rising slope, the correction coefficient K is set to be smaller as the vehicle weight Wv is heavier, as indicated by the broken line ka2 in FIG. 11, while the correction coefficient K is set to be greater as the vehicle weight Wv is lighter, as indicated by the long dashed dotted line ka3 in FIG. 11.

As indicated by the solid line kb1 in FIG. 11, when the driving road is a falling slope, the correction coefficient K is set to be greater than 1, and as the road gradient θ becomes greater, the correction coefficient K is set to be greater. When the driving road is a falling slope, the correction coefficient K is set to be greater as the vehicle weight Wv is heavier, as indicated by the broken line kb2 in FIG. 11, while the correction coefficient K is set to be smaller as the vehicle weight Wv is lighter, as indicated by the long dashed dotted line kb3 in FIG. 11.

Figure 12:
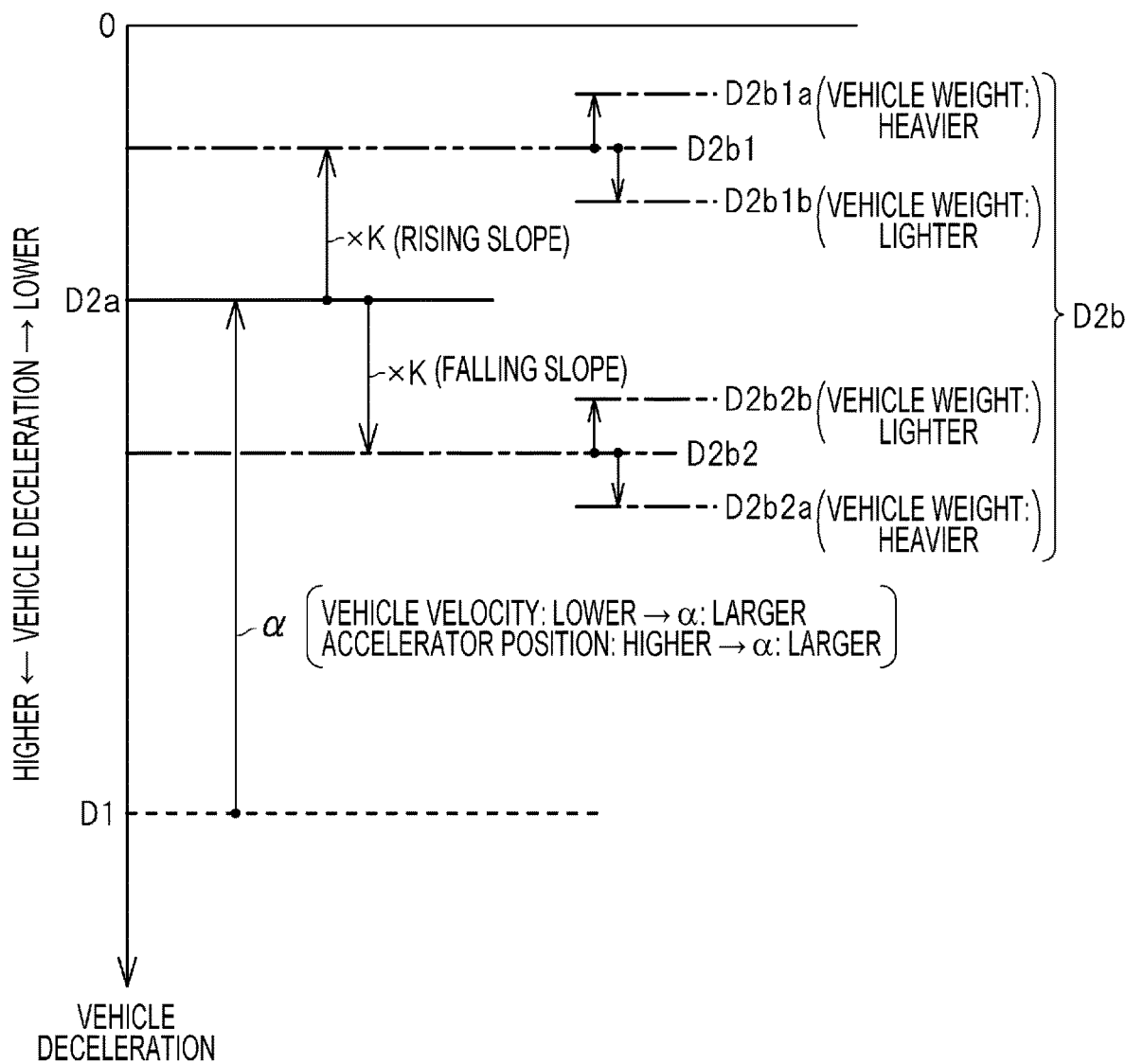
FIG. 12 illustrates an example of the setting of a corrected limit value and a corrected final limit value.

An example of the setting of the above-described corrected limit value D2$a$ and corrected final limit value D2$b$ will be explained below with reference to FIG. 12. In FIG. 12, as the corrected final limit value D2$b$, six corrected final limit values D2$b$1, D2$b$1$a$, D2$b$1$b$, D2$b$2, D2$b$2$a$, and D2$b$2$b$ are illustrated.

As illustrated in FIG. 12, when a predetermined standard limit value D1 is set, the limit value decrement amount α is subtracted from the standard limit value D1 so as to set the corrected limit value D2$a$. The limit value decrement amount α is set to be greater as the vehicle velocity V becomes lower. Hence, as the vehicle velocity V is lower, a difference between the standard limit value D1 and the corrected limit value D2$a$ becomes greater. The limit value decrement amount α is set to be greater as the accelerator position Acp is larger. Hence, as the accelerator position Acp is larger, a difference between the standard limit value D1 and the corrected limit value D2$a$ becomes greater.

When the corrected limit value D2$a$ is set, it is multiplied by the correction coefficient K so as to set the corrected final limit value D2$b$. When the driving road is a rising slope, the correction coefficient K is set to be smaller than 1. As the corrected final limit value D2$b$, the corrected final limit value D2$b$1, which is smaller than the corrected limit value D2$a$, is accordingly set. When the driving road is a rising slope, as the vehicle weight Wv is heavier, the correction coefficient K is set to be smaller. As the corrected final limit value D2$b$, the corrected final limit value D2$b$1$a$, which is smaller than the corrected final limit value D2$b$1, is accordingly set. In contrast, as the vehicle weight Wv is lighter, the correction coefficient K is set to be greater. As the corrected final limit value D2$b$, the corrected final limit value D2$b$1$b$, which is greater than the corrected final limit value D2$b$1, is accordingly set.

When the driving road is a falling slope, the correction coefficient K is set to be greater than 1. As the corrected final limit value D2$b$, the corrected final limit value D2$b$2, which is greater than the corrected limit value D2$a$, is accordingly set. When the driving road is a falling slope, as the vehicle weight Wv is heavier, the correction coefficient K is set to be greater. As the corrected final limit value D2$b$, the corrected final limit value D2$b$2$a$, which is greater than the corrected final limit value D2$b$2, is accordingly set. In contrast, as the vehicle weight Wv is lighter, the correction coefficient K is set to be smaller. As the corrected final limit value D2$b$, the corrected final limit value D2$b$2$b$, which is smaller than the corrected final limit value D2$b$2, is accordingly set.

(Setting of Regenerative Torque Limit Value)

As a limit value for a regenerative torque to be used during coasting, the torque limit value converter 54 of the main controller 30 calculates a torque limit value Td1 based on the standard limit value D1 and also calculates a torque limit value Td2 based on the corrected final limit value D2b. For example, the torque limit value converter 54 converts the standard limit value D1 into a power rate by multiplying the standard limit value D1 by the vehicle velocity V and the vehicle weight Wv, and further converts the power rate into the torque limit value Td1 by dividing the power rate by the rotational speed Nm of the driving motor 13. Likewise, the torque limit value converter 54 converts the corrected final limit value D2b into a power rate by multiplying the corrected final limit value D2b by the vehicle velocity V and the vehicle weight Wv, and further converts the power rate into the torque limit value Td2 by dividing the power rate by the rotational speed Nm of the driving motor 13.

That is, during regular-driving coasting, the regenerative torque of the driving motor 13 is limited to the torque limit value Td1 so that the vehicle deceleration is restricted to a value which does not exceed the standard limit value D1. During sports-driving coasting, the regenerative torque of the driving motor 13 is limited to the torque limit value Td2 so that the vehicle deceleration is restricted to a value which does not exceed the corrected final limit value D2b.

[Drivability Improvement Control: Flowchart]

Figure 13:
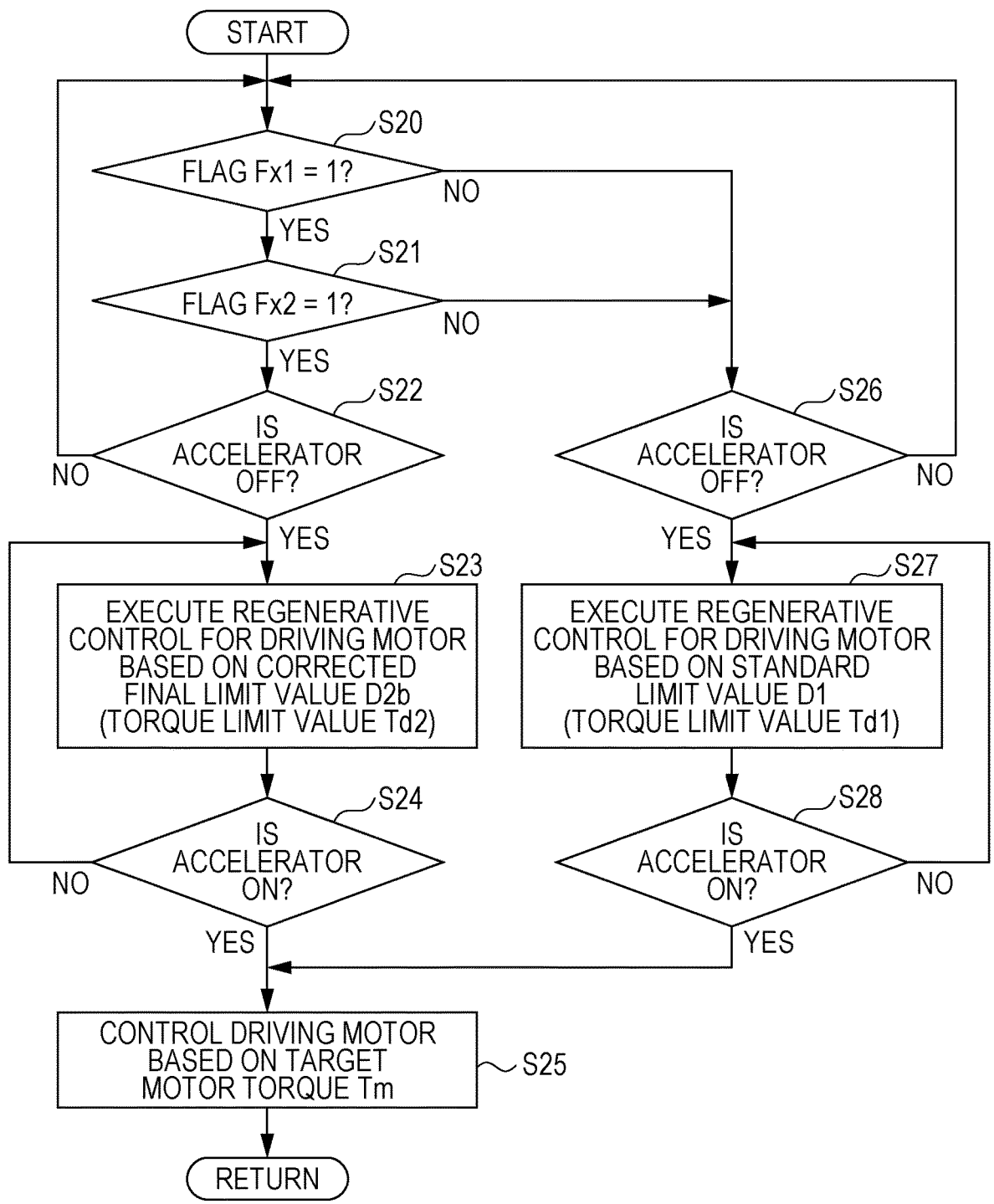
FIG. 13 is a flowchart illustrating an example of a procedure for executing drivability improvement control.

Drivability improvement control will be explained below. Drivability improvement control is to lower the vehicle deceleration in accordance with the driving situation of a coasting vehicle so as to improve the drivability. FIG. 13 is a flowchart illustrating an example of a procedure for executing drivability improvement control.

In step S20 of FIG. 13, it is determined whether the basic condition flag Fx1 is 1. If the basic condition flag Fx1 is found to be 1 in step S20, namely, if the basic conditions for executing drivability improvement control are found to be satisfied, the process proceeds to step S21. It is determined in step S21 whether the sports driving flag Fx2 is 1. If the sports driving flag Fx2 is found to be 1 in step S21, namely, if sports driving is being performed in which the driving operation strength is high, the process proceeds to step S22. In step S22, it is determined whether the accelerator pedal 33 is released (accelerator is OFF).

If it is found in step S22 that the accelerator pedal 33 is released, that is, if the accelerator position Acp is smaller than a predetermined threshold, the process proceeds to step S23. In step S23, regenerative control for the driving motor 13 is executed so that the vehicle deceleration does not exceed the corrected final limit value D2b. That is, the regenerative torque of the driving motor 13 is limited to a value which does not exceed the above-described torque limit value Td2. In step S24, it is determined whether the accelerator pedal 33 is stepped on (accelerator is ON). If it is found in step S24 that the accelerator pedal 33 is stepped on, that is, if the accelerator position Acp exceeds the predetermined threshold, the process proceeds to step S25. In step S25, the driving motor 13 is controlled based on the target motor torque Tm determined by the accelerator position Acp.

If the basic condition flag Fx1 is found to be 0 in step S20, namely, if it is determined that the basic conditions for executing drivability improvement control are not satisfied, the process proceeds to step S26. In step S26, it is determined whether the accelerator pedal 33 is released. If the sports driving flag Fx2 is found to be 0 in step S21, namely, if regular driving is being performed in which the driving operation strength is low, the process also proceeds to step S26.

In this manner, if it is determined in step S20 that the basic conditions for executing drivability improvement control are not satisfied or if it is determined in step S21 that regular driving is being performed, the process proceeds to step S26. If the accelerator pedal 33 is found to be released in step S26, the process proceeds to step S27. In step S27, regenerative control for the driving motor 13 is executed so that the vehicle deceleration does not exceed the standard limit value D1. That is, the regenerative torque of the driving motor 13 is limited to a value which does not exceed the above-described torque limit value Td1. If it is found in step S28 that the accelerator pedal 33 is stepped on (accelerator is ON), the process proceeds to step S25. In step S25, the driving motor 13 is controlled based on the target motor torque Tm determined by the accelerator position Acp.

[Drivability Improvement Control: Timing Chart]

Figure 14:
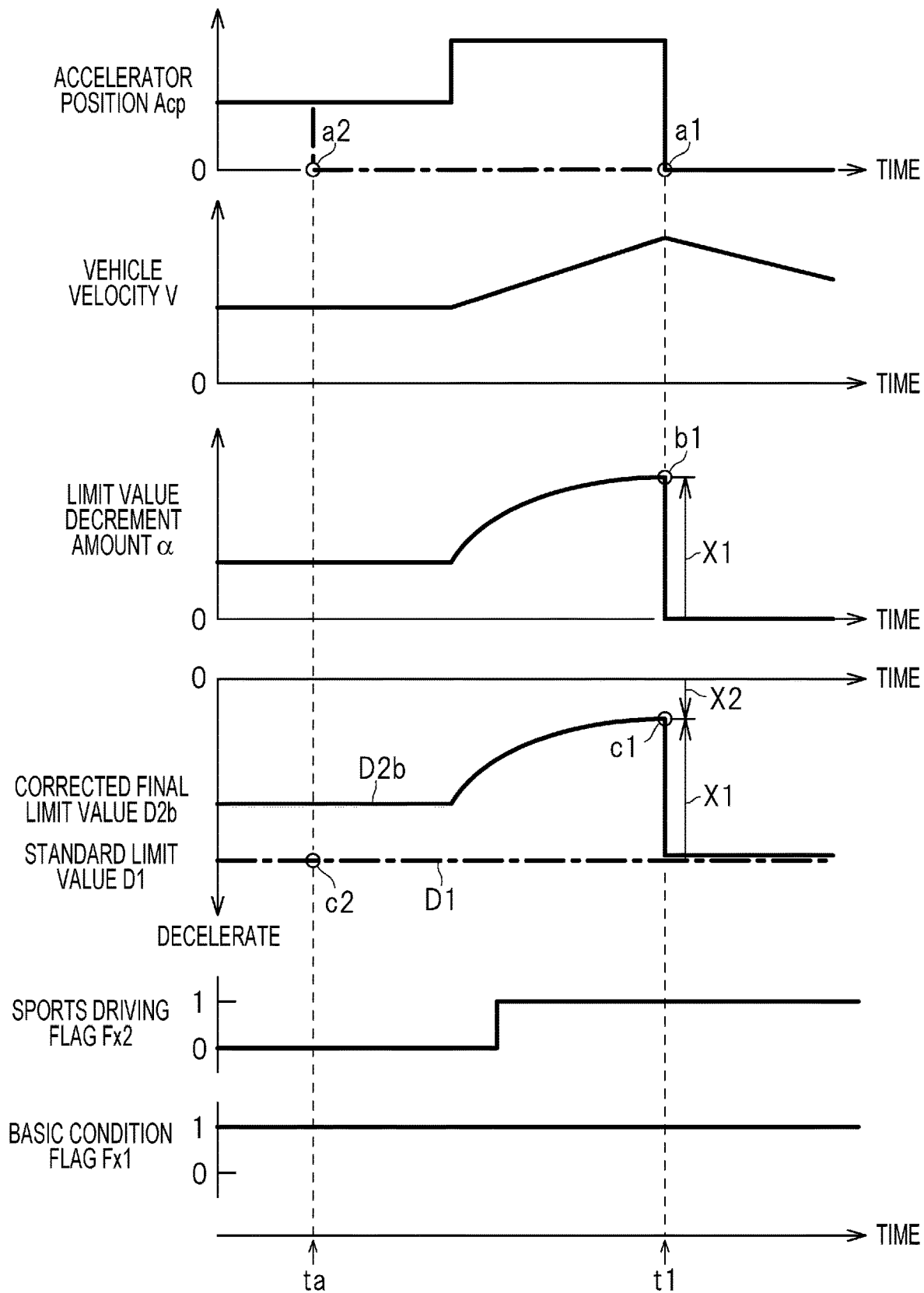
FIG. 14 is a timing chart illustrating an example of the execution of drivability improvement control.

Drivability improvement control will now be described below with reference to a timing chart. FIG. 14 is a timing chart illustrating an example of the execution of drivability improvement control. As illustrated in FIG. 14, while the vehicle 11 is driving with the accelerator pedal 33 pressed down, the limit value decrement amount $\alpha$ used for calculating the corrected final limit value D2b is set based on the accelerator position Acp and the vehicle velocity V. At time t1, when the accelerator pedal 33 is released (indicated by a1 in FIG. 14), the vehicle 11 starts coasting and the driving motor 13 is controlled to enter a regenerative state.

The basic condition flag Fx1 and the sports driving flag Fx2 are 1 at time t1. That is, the driving mode is sports driving in which the driving operation strength is high. Hence, the limit value decrement amount $\alpha$ is set to be X1 (indicated by b1 in FIG. 14), and the corrected final limit value D2b is set to be X2 (indicated by c1 in FIG. 14). Then, based on the corrected final limit value X2, motor regenerative control is executed during coasting. The corrected final limit value X2 is the corrected final limit value D2b which is calculated based on the accelerator position Acp and the vehicle velocity V at a timing when the accelerator pedal 33 is released. Based on the corrected final limit value X2, the degree of deceleration can be decreased while the vehicle 11 is coasting in the sports driving mode. That is, the degree of deceleration can be lowered in accordance with sports driving in which the driving operation strength is high, thereby making it possible to enhance the drivability of the vehicle 11.

At time ta, when the accelerator pedal 33 is released (indicated by a2 in FIG. 14), the vehicle 11 starts coasting and the driving motor 13 is controlled to enter a regenerative state. The sports driving flag Fx2 is 0 at time ta. That is, the driving mode is regular driving in which the driving operation strength is low. Hence, the standard limit value D1 is selected as the limit value for limiting the vehicle deceleration (indicated by c2 in FIG. 14). Then, based on the standard limit value D1, which is greater than the corrected final limit value D2b, motor regenerative control is executed during coasting. Based on the standard limit value D1, the degree of deceleration can be increased while the vehicle 11 is coasting in the regular driving mode. That is, the degree of deceleration can be raised in accordance with regular driving in which the driving operation strength is low, thereby making it possible to enhance the drivability of the vehicle 11.

[Drivability Improvement Control: First and Second Examples]

Figure 15:
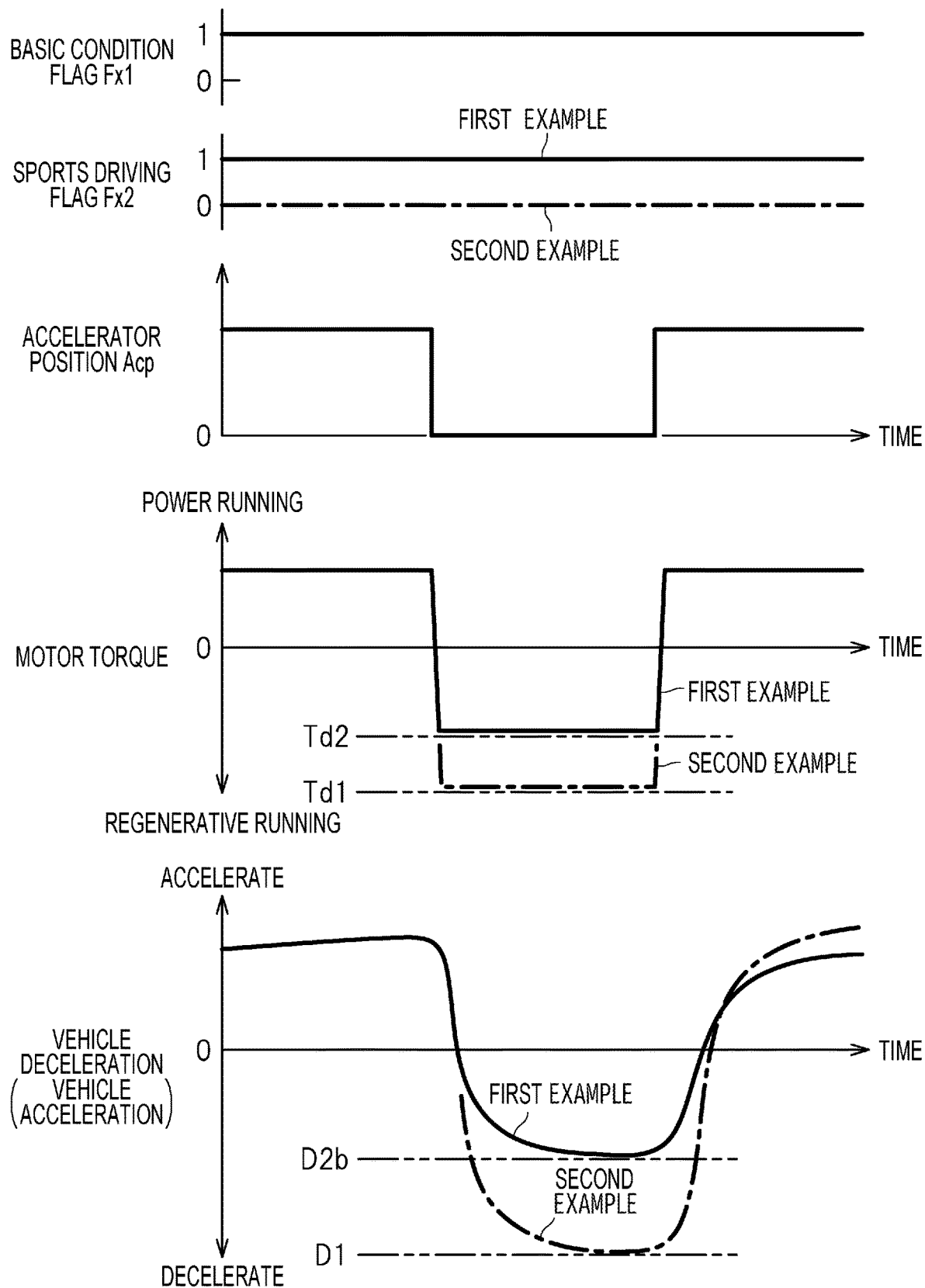
FIG. 15 is a timing chart illustrating an example of the execution of drivability improvement control according to examples.

First and second examples of drivability improvement control will be described below with reference to a timing chart. FIG. 15 is a timing chart illustrating an example of the execution of drivability improvement control according to the first and second examples. Sports driving is performed in the first example, while regular driving is performed in the second example. In FIG. 15, the first example is indicated by the solid line, while the second example is indicated by the long dashed dotted line. Regarding each of the basic condition flag Fx1 and the accelerator position Acp, the first and second examples are indicated by the same solid line.

As indicated by the solid line in FIG. 15, in the first example, the sports driving flag Fx2 is set to be 1, and the driving mode is found to be sports driving. Hence, the corrected final limit value D2b is set as the limit value for limiting the vehicle deceleration, and the torque limit value Td2 is set based on the corrected final limit value D2b. During coasting, the regenerative torque, which is a regenerative motor torque, is controlled so that it does not exceed the torque limit value Td2, and the vehicle deceleration is controlled so that it does not exceed the corrected final limit value D2b.

As indicated by the long dashed dotted line in FIG. 15, in the second example, the sports driving flag Fx2 is set to be 0, and the driving mode is found to be regular driving. Hence, the standard limit value D1 is set as the limit value for limiting the vehicle deceleration, and the torque limit value Td1 is set based on the standard limit value D1. During coasting, the regenerative torque is controlled so that it does not exceed the torque limit value Td1, and the vehicle deceleration is controlled so that it does not exceed the standard limit value D1.

As illustrated in FIG. 15, for sports driving, the corrected final limit value D2b, which is smaller than the standard limit value D1, is set as the limit value for limiting the vehicle deceleration. As the torque limit value for limiting the regenerative torque, the torque limit value Td2, which is smaller than the torque limit value Td1, is set. This can make the regenerative torque during coasting for sports driving smaller than that for regular driving and accordingly make the vehicle deceleration during coasting for sports driving smaller than that for regular driving.

In other words, when the vehicle 11 stops accelerating during sports driving, the regenerative torque of the driving motor 13 is limited based on the corrected final limit value D2b. In contrast, when the vehicle 11 stops accelerating during regular driving, the regenerative torque of the driving motor 13 is limited based on the standard limit value D1. That is, when the vehicle 11 stops accelerating during sports driving, the regenerative torque of the driving motor 13 can be made smaller than that when the vehicle 11 stops accelerating during regular driving. As a result, the degree of deceleration can be lowered in accordance with sports driving in which the driving operation strength is high, thereby making it possible to enhance the drivability of the vehicle 11.

[Drivability Improvement Control: Third and Fourth Examples]

Third and fourth examples of drivability improvement control will be described below with reference to a timing chart. FIG. 16 is a timing chart illustrating an example of the execution of drivability improvement control according to the third and fourth examples. Sports driving is performed with a small accelerator position Acp in the third example, while sports driving is performed with a large accelerator position Acp in the fourth example. In FIG. 16, the third example is indicated by the solid line, while the fourth example is indicated by the long dashed dotted line. Regarding each of the basic condition flag Fx1 and the sports driving flag Fx2, the third and fourth examples are indicated by the same solid line.

As indicated by the solid line in FIG. 16, in the third example, since sports driving is performed with a small accelerator position Acp, a corrected final limit value D2ba is set as the limit value for limiting the vehicle deceleration, and a torque limit value Td2a is set based on the corrected final limit value D2ba. During coasting, the regenerative torque is controlled so that it does not exceed the torque limit value Td2a, and the vehicle deceleration is controlled so that it does not exceed the corrected final limit value D2ba.

As indicated by the long dashed dotted line in FIG. 16, in the fourth example, since sports driving is performed with a large accelerator position Acp, a corrected final limit value D2bb is set as the limit value for limiting the vehicle deceleration, and a torque limit value Td2b is set based on the corrected final limit value D2bb. During coasting, the regenerative torque is controlled so that it does not exceed the torque limit value Td2b, and the vehicle deceleration is controlled so that it does not exceed the corrected final limit value D2bb.

As illustrated in FIG. 16, for sports driving with a large accelerator position Acp, the corrected final limit value D2bb, which is smaller than the corrected final limit value D2ba used for sports driving with a small accelerator position Acp, is set. Additionally, the torque limit value Td2b, which is smaller than the torque limit value Td2a used for sports driving with a small accelerator position Acp, is set. In this manner, for sports driving with a large accelerator position Acp, the degree of vehicle deceleration can be lowered in accordance with a high driving operation strength, thereby making it possible to enhance the drivability of the vehicle 11.

[Drivability Improvement Control: Fifth and Sixth Examples]

Figure 17:
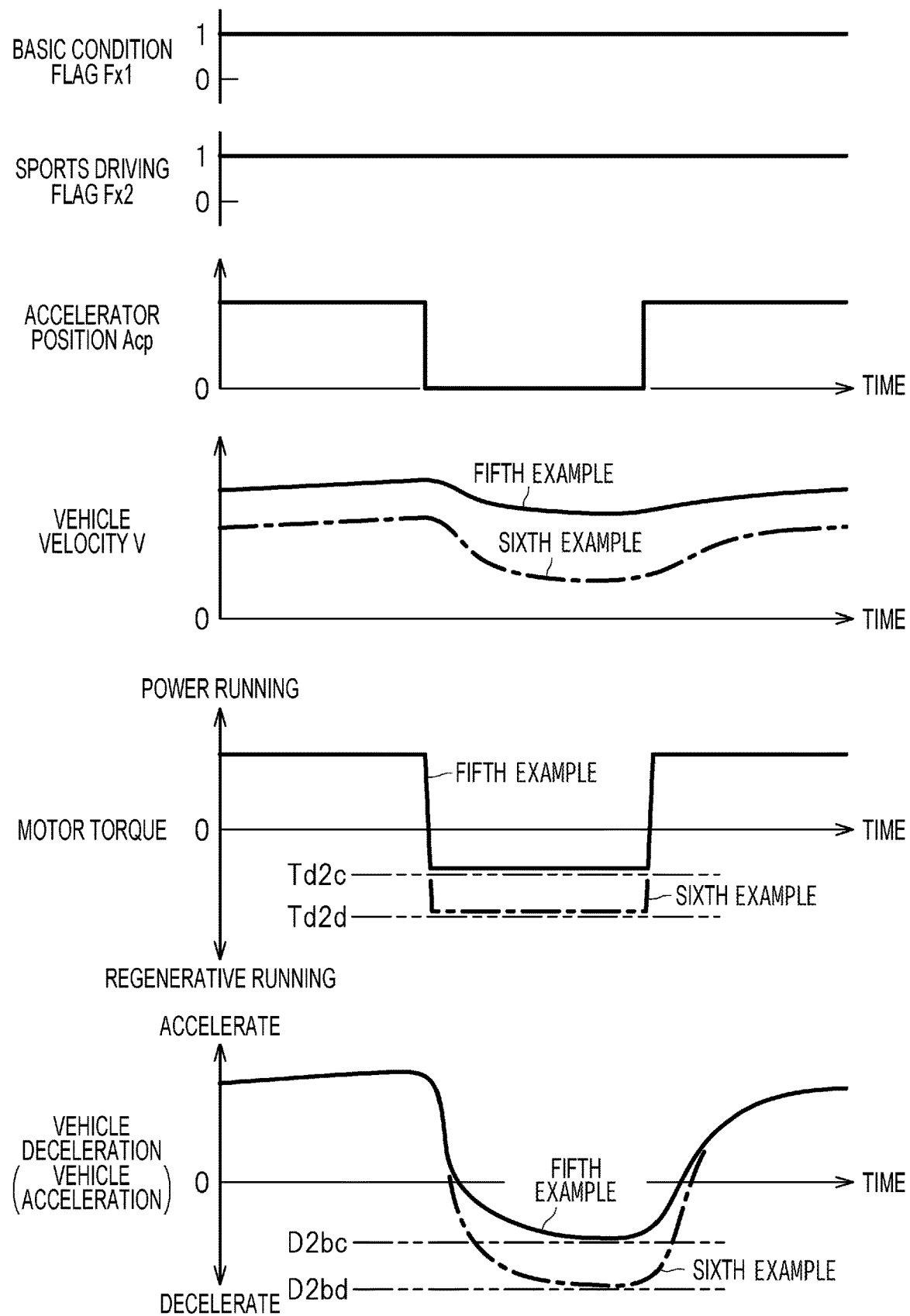
FIG. 17 is a timing chart illustrating an example of the execution of drivability improvement control according to examples.

Fifth and sixth examples of drivability improvement control will be described below with reference to a timing chart. FIG. 17 is a timing chart illustrating an example of the execution of drivability improvement control according to the fifth and sixth examples. Sports driving is performed at a high vehicle velocity V in the fifth example, while sports driving is performed at a low vehicle velocity V in the sixth example. In FIG. 17, the fifth example is indicated by the solid line, while the sixth example is indicated by the long dashed dotted line. Regarding each of the basic condition flag Fx1, the sports driving flag Fx2, and the accelerator position Acp, the fifth and sixth examples are indicated by the same solid line.

As indicated by the solid line in FIG. 17, in the fifth example, since sports driving is performed at a high vehicle velocity V, a corrected final limit value D2bc is set as the limit value for limiting the vehicle deceleration, and a torque limit value Td2c is set based on the corrected final limit value D2bc. During coasting, the regenerative torque is controlled so that it does not exceed the torque limit value Td2c, and the vehicle deceleration is controlled so that it does not exceed the corrected final limit value D2bc.

As indicated by the long dashed dotted line in FIG. 17, in the sixth example, since sports driving is performed at a low vehicle velocity V, a corrected final limit value D2bd is set as the limit value for limiting the vehicle deceleration, and a torque limit value Td2d is set based on the corrected final limit value D2bd. During coasting, the regenerative torque is controlled so that it does not exceed the torque limit value Td2$d$, and the vehicle deceleration is controlled so that it does not exceed the corrected final limit value D2$bd$.

As illustrated in FIG. 17, for sports driving at a high vehicle velocity V, the corrected final limit value D2$bc$, which is smaller than the corrected final limit value D2$bd$ used for sports driving at a low vehicle velocity V, is set. Additionally, the torque limit value Td2$c$, which is smaller than the torque limit value Td2$d$ used for sports driving at a low vehicle velocity V, is set. In this manner, for sports driving at a high vehicle velocity V, the degree of vehicle deceleration can be lowered in accordance with a high driving operation strength, thereby making it possible to enhance the drivability of the vehicle 11.

[Drivability Improvement Control: Seventh, Eighth, and Ninth Examples]

Figure 18:
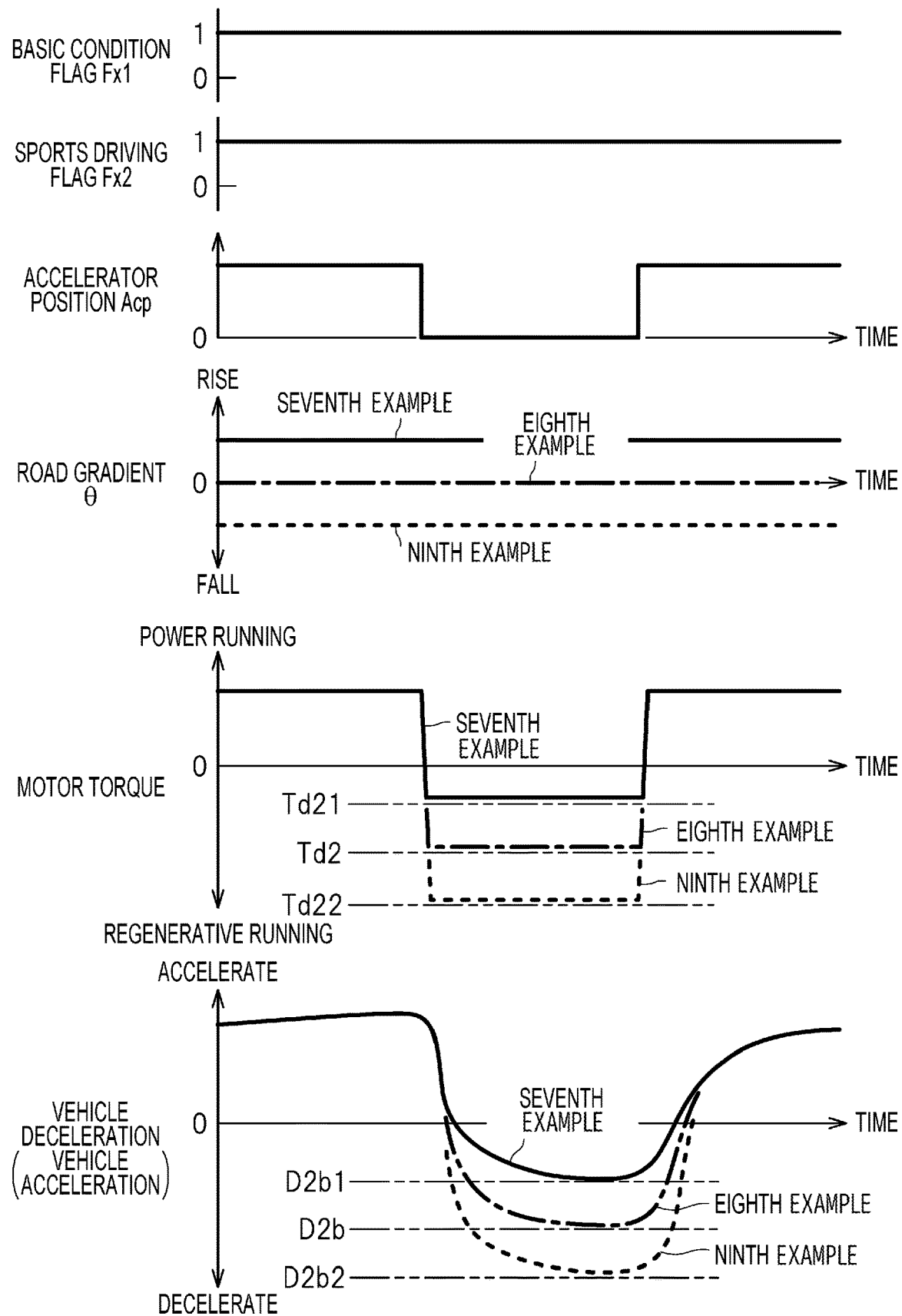
FIG. 18 is a timing chart illustrating an example of the execution of drivability improvement control according to examples.

Seventh, eighth, and ninth examples of drivability improvement control will be described below with reference to a timing chart. FIG. 18 is a timing chart illustrating an example of the execution of drivability improvement control according to the seventh, eighth, and ninth examples. Sports driving is performed on a rising slope in the seventh example; sports driving is performed on a flat road in the eighth example; and sports driving is performed on a falling slope in the ninth example. In FIG. 18, the seventh example is indicated by the solid line; the eighth example is indicated by the long dashed dotted line; and the ninth example is indicated by the broken line. Regarding each of the basic condition flag Fx1, the sports driving flag Fx2, and the accelerator position Acp, the seventh, eighth, and ninth examples are indicated by the same solid line.

As indicated by the solid line in FIG. 18, in the seventh example, since sports driving is performed on a rising slope, the corrected final limit value D2$b$1 is set as the limit value for limiting the vehicle deceleration, and a torque limit value Td21 is set based on the corrected final limit value D2$b$1. During coasting, the regenerative torque is controlled so that it does not exceed the torque limit value Td21, and the vehicle deceleration is controlled so that it does not exceed the corrected final limit value D2$b$1.

As indicated by the long dashed dotted line in FIG. 18, in the eighth example, since sports driving is performed on a flat road, the corrected final limit value D2$b$ is set as the limit value for limiting the vehicle deceleration, and the torque limit value Td2 is set based on the corrected final limit value D2$b$. During coasting, the regenerative torque is controlled so that it does not exceed the torque limit value Td2, and the vehicle deceleration is controlled so that it does not exceed the corrected final limit value D2$b$.

As indicated by the broken line in FIG. 18, in the ninth example, since sports driving is performed on a falling slope, the corrected final limit value D2$b$2 is set as the limit value for limiting the vehicle deceleration, and a torque limit value Td22 is set based on the corrected final limit value D2$b$2. During coasting, the regenerative torque is controlled so that it does not exceed the torque limit value Td22, and the vehicle deceleration is controlled so that it does not exceed the corrected final limit value D2$b$2.

As illustrated in FIG. 18, for sports driving on a rising slope, the corrected final limit value D2$b$1, which is smaller than the corrected final limit value D2$b$ used for sports driving on a flat road, is set. Additionally, the torque limit value Td21, which is smaller than the torque limit value Td2 used for sports driving on a flat road, is set. For sports driving on a rising slope, since the vehicle 11 decelerates by gravity, the vehicle deceleration is lowered, thereby preventing the vehicle 11 from excessively decelerating.

In contrast, for sports driving on a falling slope, the corrected final limit value D2$b$2, which is greater than the corrected final limit value D2$b$ used for sports driving on a flat road, is set. Additionally, the torque limit value Td22, which is greater than the torque limit value Td2 used for sports driving on a flat road, is set. For sports driving on a falling slope, since the vehicle 11 accelerates by gravity, the vehicle deceleration is increased, thereby preventing the vehicle 11 from excessively accelerating.

The disclosure is not limited to the above description and may be modified and changed variously without departing from the technical scope of the disclosure.

In the above description, the vehicle 11 using the vehicle control device 10 is an electric automobile including the driving motor 13 as a power source. However, this is only an example, and the vehicle control device 10 may be applied to a hybrid vehicle including the driving motor 13 and an engine as power sources.

In the above description, the target torque setter 50, the basic condition determiner 51, the driving mode determiner 52, the deceleration limit value setter 53, and the torque limit value converter 54 are provided in the main controller 30, while the motor controller 31 serves as a control unit that controls the driving motor 13. Alternatively, the target torque setter 50, the basic condition determiner 51, the driving mode determiner 52, the deceleration limit value setter 53, the torque limit value converter 54, and the motor controller 31 may all be provided in a single controller.

In the above description, the corrected final limit value D2$b$, which is calculated by multiplying the corrected limit value D2$a$ by the correction coefficient K, is used as the second limit value. However, the second limit value may be calculated in a different manner. For example, the corrected limit value D2$a$, which is calculated by subtracting the limit value decrement amount $\alpha$ from the standard limit value D1, may be used as the second limit value.

In the above description, two regenerative modes (high regenerative mode and low regenerative mode) are set and one of them is selected as the regenerative mode to be used during coasting. This is only an example. A vehicle using the vehicle control device of an embodiment of the disclosure may have only one regenerative mode to be used during coasting.

In the above description, when the SOC of the battery 20 is lower than the threshold sa, it is determined that one of the basic conditions for executing drivability improvement control is satisfied. However, this is only an example. The charging permissible power of the battery 20 may be calculated based on the SOC and the battery temperature, and when the charging permissible power exceeds a predetermined threshold, it may be determined that one of the basic conditions for executing drivability improvement control is satisfied. When the battery temperature is lower than a predetermined threshold, it may be determined that one of the basic conditions for executing drivability improvement control is satisfied.

In the above description, when the vehicle velocity is lower than the threshold va, it is determined that one of the basic conditions for executing drivability improvement control is satisfied. Additionally, when the regenerative mode is the high regenerative mode, it is determined that one of the basic conditions for executing drivability improvement control is satisfied. These are also only examples.

According to an embodiment of the disclosure, when a vehicle stops accelerating in a second driving mode, the motor controller makes a regenerative torque of a driving motor smaller than that when the vehicle stops accelerating in a first driving mode. This makes it possible to suitably control the degree of deceleration of a vehicle while the vehicle is coasting.

The main controller 30 and the motor controller 31 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the motor controller 31 and the main controller 30 including the target torque setter 50, the basic condition determiner 51, the driving mode determiner 52, the deceleration limit value setter 53, and the torque limit value converter 54. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle control device for a vehicle, the vehicle control device being configured to control a driving motor which is coupled to a wheel of the vehicle so that the driving motor enters a regenerative state while the vehicle is coasting and stops accelerating, the vehicle control device comprising:
a determiner, coupled to acceleration sensors, configured to:
determine whether (1) longitudinal acceleration and (2) lateral acceleration being experienced by the vehicle exceed first and second threshold values, respectively; and
determine whether the vehicle is experiencing both (1) the longitudinal acceleration exceeding the first threshold value and (2) the lateral acceleration exceeding the second threshold value, either at a first frequency or at a second frequency lower than the first frequency; and
a controller configured to, when the vehicle stops acceleration after determining that the vehicle is experiencing both (1) the longitudinal acceleration exceeding the first threshold value and (2) the lateral acceleration exceeding the second threshold value at the first frequency, control a regenerative torque of the driving motor to become smaller than when the vehicle stops accelerating after determining that the vehicle is experiencing both (1) the longitudinal acceleration exceeding the first threshold value and (2) the lateral acceleration exceeding the second threshold value at the second frequency.

2. The vehicle control device according to claim 1, further comprising:
a limit value setter configured to set a first limit value and a second limit value as a limit value used for limiting a degree of deceleration of the vehicle during coasting, the second limit value being smaller than the first limit value, wherein
in the case where the vehicle stops accelerating after determining that the vehicle is experiencing both (1) the longitudinal acceleration exceeding the first threshold value and (2) the lateral acceleration exceeding the second threshold value at the second frequency, the controller is configured to limit the regenerative torque of the driving motor based on the first limit value, and
in the case where the vehicle stops accelerating after determining that the vehicle is experiencing both (1) the longitudinal acceleration exceeding the first threshold value and (2) the lateral acceleration exceeding the second threshold value at the first frequency, the controller is configured to limit the regenerative torque of the driving motor based on the second limit value.

3. The vehicle control device according to claim 2, wherein, in acase where (1) the vehicle stops accelerating after determining that the vehicle is experiencing both (1) the longitudinal acceleration exceeding the first threshold value and (2) the lateral acceleration exceeding the second threshold value at the first frequency and (2) a velocity of the vehicle is lower than a threshold, the controller is configured to limit the regenerative torque of the driving motor based on the second limit value.

4. The vehicle control device according to claim 3, wherein the limit value setter is configured to set the first and second limit values so that a difference between the first and second limit values becomes greater as the velocity of the vehicle becomes lower.

5. The vehicle control device according to claim 4, wherein the limit value setter is configured to set the first limit value and the second limit value so that the difference between the first and second limit values becomes greater as an amount of an accelerating operation becomes larger.

6. The vehicle control device according to claim 3, wherein the limit value setter is configured to set the first limit value and the second limit value so that a difference between the first and second limit values becomes greater as an amount of an accelerating operation becomes larger.

7. The vehicle control device according to claim 2, wherein the limit value setter is configured to set the first and second limit values so that a difference between the first and second limit values becomes greater as a velocity of the vehicle becomes lower.

8. The vehicle control device according to claim 7, wherein the limit value setter is configured to set the first limit value and the second limit value so that a difference between the first and second limit values becomes greater as an amount of an accelerating operation becomes larger.

9. The vehicle control device according to claim 2, wherein the limit value setter is configured to set the first limit value and the second limit value so that a difference between the first and second limit values becomes greater as an amount of an accelerating operation becomes larger.

10. A vehicle control device to be applied to for a vehicle, the vehicle comprising a wheel, a driving motor which is coupled to the wheel and acceleration sensors, the vehicle control device comprising:
circuitry, coupled to the driving motor and the acceleration sensors, configured to:
determine whether (1) longitudinal acceleration and (2) lateral acceleration being experienced by the vehicle exceed first and second threshold values, respectively;
determine whether the vehicle is experiencing both (1) the longitudinal acceleration exceeding the first threshold value and (2) the lateral acceleration exceeding the second threshold value, either at a first frequency or at a second frequency lower than the first frequency; and when the vehicle stops acceleration after determining that the vehicle is experiencing both (1) the longitudinal acceleration exceeding the first threshold value and (2) the lateral acceleration exceeding the second threshold value at the first frequency, control a regenerative torque of the driving motor to become smaller than when the vehicle stops accelerating after determining that the vehicle is experiencing both (1) the longitudinal acceleration exceeding the first threshold value and (2) the lateral acceleration exceeding the second threshold value at the second frequency.

11. A vehicle comprising:
a wheel;
a driving motor coupled to the wheel;
acceleration sensors configured to detect longitudinal acceleration and lateral acceleration; and
a circuitry coupled to the driving motor and the acceleration sensors, and configured to:
  calculate a first ratio that is a ratio of a first length of time for which an absolute value of the detected longitudinal acceleration exceeds a first predetermined threshold to a predetermined determination time;
  calculate a second ratio that is a ratio of a second length of time for which an absolute value of the detected lateral acceleration exceeds a second predetermined threshold to the predetermined determination time;
  determine whether the calculated first ratio exceeds a third predetermined ratio;
  determine whether the calculated second ratio exceeds a fourth predetermined ratio;
  when the vehicle stops acceleration after (1) determining that the calculated first ratio does not exceed the third predetermined ratio or (2) determining that the calculated second ratio does not exceed the fourth predetermined ratio, control the driving motor so that a regenerative torque generated by the driving motor does not exceed a first limit value; and
  when the vehicle stops acceleration after (1) determining that the calculated first ratio exceeds the third predetermined ratio and (2) determining that the calculated second ratio exceeds the fourth predetermined ratio, control the driving motor so that the regenerative torque does not exceed a second limit value, an absolute value of the second limit value being lower than an absolute value of the first limit value.

12. The vehicle according to claim 11, further comprising a vehicle velocity sensor configured to detect a velocity of the vehicle,
  wherein the circuitry is coupled to the vehicle velocity sensor and configured to set the first and second limit values so that a difference between the first and second limit values becomes greater as the detected velocity becomes lower.

13. The vehicle according to claim 11, further comprising an accelerator sensor configured to detect an amount of an accelerating operation during the acceleration,
  wherein the circuitry is coupled to the accelerator sensor and configured to set the first and second limit values so that a difference between the first and second limit values becomes greater as the detected amount of the accelerating operation becomes larger.

14. The vehicle according to claim 11, further comprising a gradient sensor configured to detect a gradient of a road on which the vehicle is traveling, the gradient being positive when the road is a rising slope and being negative when the road is a falling slope,
  wherein the circuitry is coupled to the gradient sensor and configured to set the first and second limit values so that a difference between the first and second limit values becomes greater as the detected gradient becomes larger.

15. The vehicle according to claim 14, further comprising a vehicle weight sensor configured to detect a weight of the vehicle,
  wherein the circuitry is coupled to the vehicle weight sensor and configured to:
  when the detected gradient is positive, set the first and second limit values so that the difference between the first and second limit values becomes greater as the detected weight becomes larger; and
  when the detected gradient is negative, set the first and second limit values so that the difference between the first and second limit values becomes greater as the detected weight becomes smaller.

* * * * *